United States Patent
Kolesnikov et al.

(10) Patent No.: US 10,097,845 B2
(45) Date of Patent: Oct. 9, 2018

(54) METHOD, APPARATUS AND SYSTEM FOR ENCODING AND DECODING VIDEO DATA USING A BLOCK DICTIONARY

(71) Applicant: CANON KABUSHIKI KAISHA, Tokyo (JP)

(72) Inventors: Volodymyr Kolesnikov, Marsfield (AU); Christopher James Rosewarne, Gosford (AU)

(73) Assignee: Canon Kabushiki Kaisha, Tokyo (JP)

( * ) Notice: Subject to any disclaimer, the term of this patent is extended or adjusted under 35 U.S.C. 154(b) by 490 days.

(21) Appl. No.: 14/645,173

(22) Filed: Mar. 11, 2015

(65) Prior Publication Data
US 2015/0264372 A1    Sep. 17, 2015

(30) Foreign Application Priority Data
Mar. 14, 2014  (AU) ................... 2014201583

(51) Int. Cl.
| | |
|---|---|
| H04N 7/12 | (2006.01) |
| H04N 11/02 | (2006.01) |
| H04N 11/04 | (2006.01) |
| H04N 19/423 | (2014.01) |
| H04N 19/52 | (2014.01) |

(52) U.S. Cl.
CPC ........... *H04N 19/423* (2014.11); *H04N 19/52* (2014.11)

(58) Field of Classification Search
None
See application file for complete search history.

(56) References Cited

U.S. PATENT DOCUMENTS

| | | | | |
|---|---|---|---|---|
| 6,115,076 A | * | 9/2000 | Linzer | H04N 5/772 348/239 |
| 2016/0277761 A1 | * | 9/2016 | Li | H04N 19/124 |

OTHER PUBLICATIONS

Budagavi et al., "AHG8: Video coding using Intra motion compensation", Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, pp. 1-5.

(Continued)

*Primary Examiner* — Sath V Perungavoor
*Assistant Examiner* — Xiaolan Xu
(74) *Attorney, Agent, or Firm* — Canon USA, Inc. I.P. Division

(57) ABSTRACT

A method of decoding a coding unit from a video bitstream determines reconstructed samples for a first coding unit, from the video bitstream, and decodes a dictionary store flag from the video bitstream for the first coding unit. Where the dictionary store flag indicates that reconstructed samples for the first coding unit be stored, the method (i) stores the reconstructed samples for the first coding unit into a memory buffer; (ii) determines reconstructed samples for a second coding unit, the reconstructed samples for the second coding unit being copied from reconstructed samples for the first coding unit from the memory buffer, and (iii) outputs the reconstructed samples for the second coding unit. Also disclosed is a complementary method for encoding, a decoder and an encoder.

19 Claims, 19 Drawing Sheets

(56) References Cited

OTHER PUBLICATIONS

Lin et al., "AHG8: P2M based dual-coder extension of HEVC", Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, pp. 1-5.

Pu et al., "Suggested Software for the AHG on Investigation of Palette Mode Coding Tools", Joint Collaborative Team on Video Coding (JCT-VC) of ITU-T SG 16 WP 3 and ISO/IEC JTC 1/SC 29/WG 11, 16th Meeting: San José, US, Jan. 9-17, 2014, pp. 1-5.

* cited by examiner

Fig. 5A
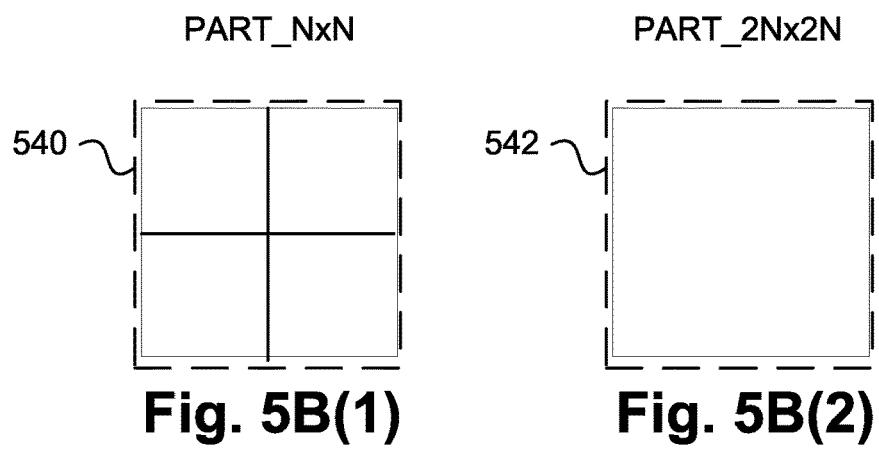
Fig. 5B(1)　　　Fig. 5B(2)
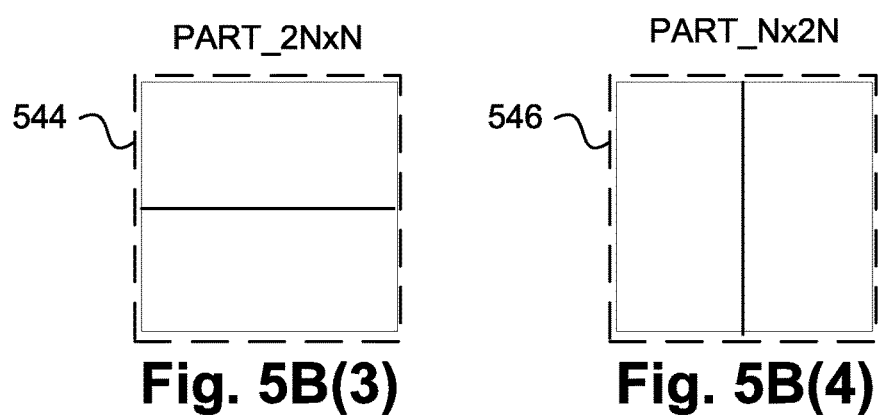
Fig. 5B(3)　　　Fig. 5B(4)

| 0 | 1 | 4 | 5 | 16 | 17 | 20 | 21 |
|---|---|---|---|----|----|----|----|
| 2 | 3 | 6 | 7 | 18 | 19 | 22 | 23 |
| 8 | 9 | 12 | 13 | 24 | 25 | 28 | 29 |
| 10 | 11 | 14 | 15 | 26 | 27 | 30 | 31 |
| 32 | 33 | 36 | 37 | 48 | 49 | 52 | 53 |
| 34 | 35 | 38 | 39 | 50 | 51 | 54 | 55 |
| 40 | 41 | 44 | 45 | 56 | 57 | 60 | 61 |
| 42 | 43 | 46 | 47 | 58 | 59 | 62 | 63 |

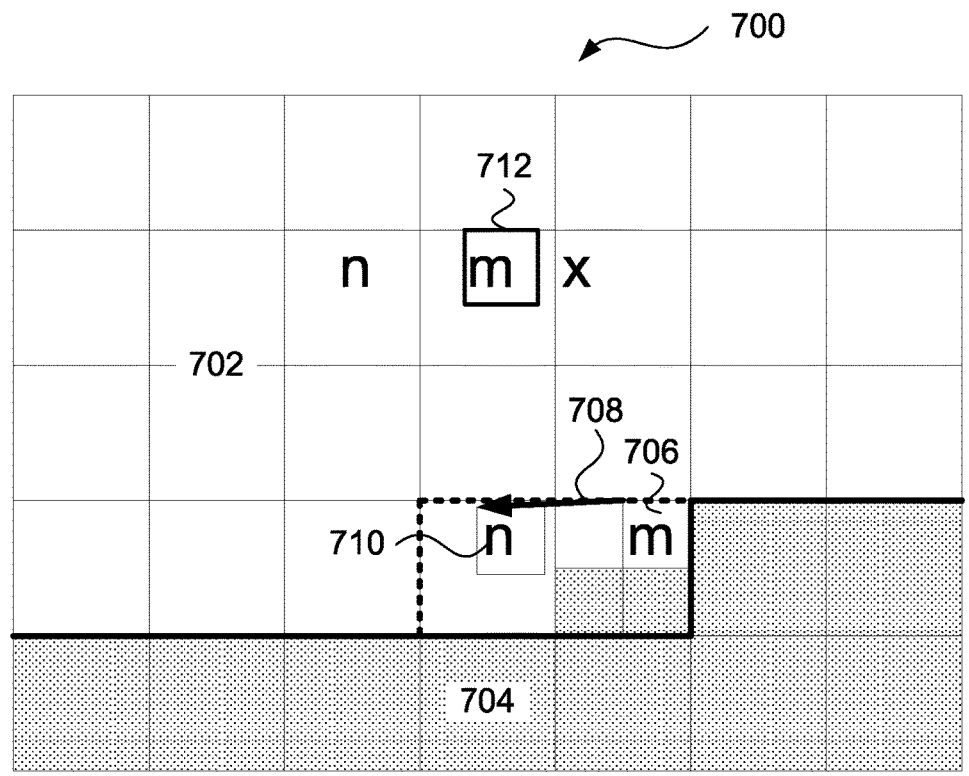
Fig. 7A(1)
Fig. 7A(2)

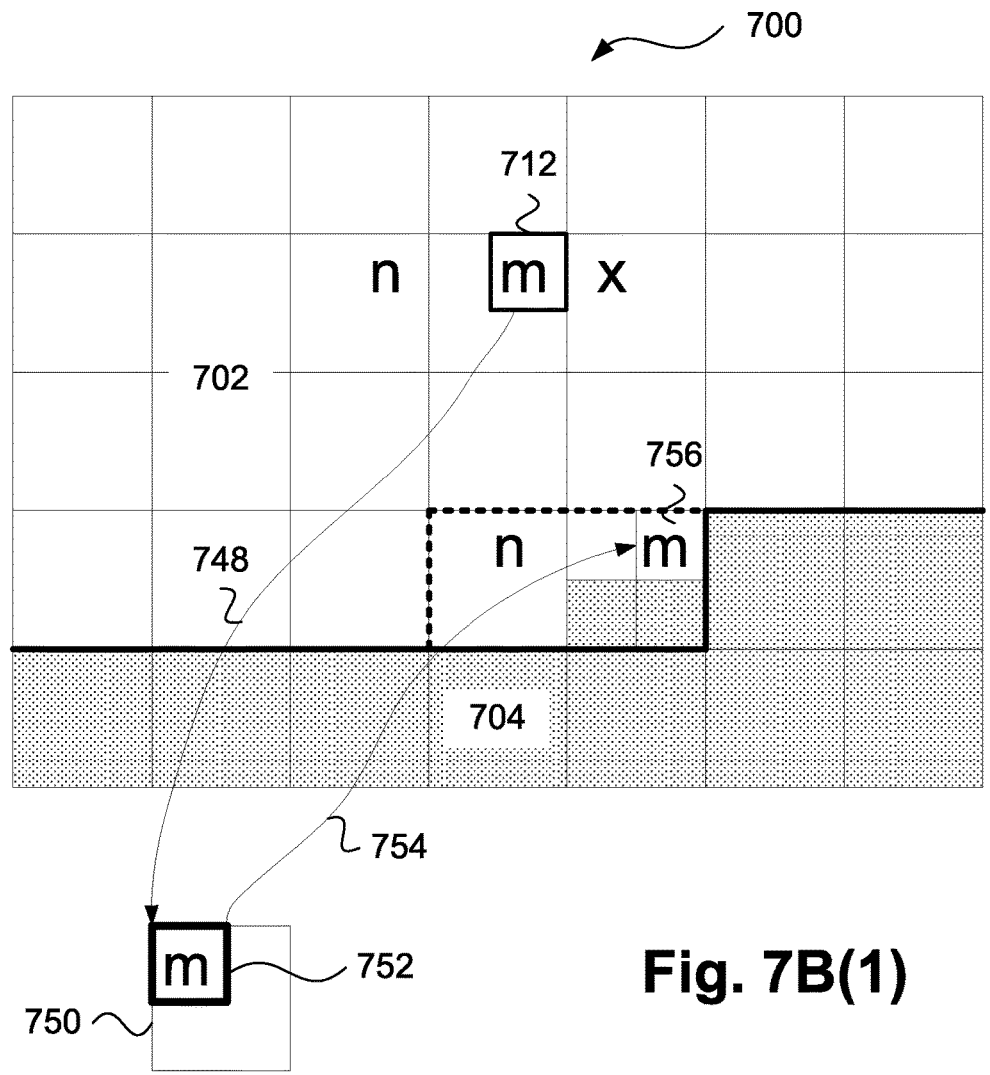
Fig. 7B(1)
Fig. 7B(2)

METHOD, APPARATUS AND SYSTEM FOR ENCODING AND DECODING VIDEO DATA USING A BLOCK DICTIONARY

REFERENCE TO RELATED PATENT APPLICATION(S)

This application claims the benefit under 35 U.S.C. § 119 of the filing date of Australian Patent Application No. 2014201583, filed Mar. 14, 2014, hereby incorporated by reference in its entirety as if fully set forth herein.

TECHNICAL FIELD

The present invention relates generally to digital video signal processing and, in particular, to a method, apparatus and system for encoding and decoding video data. The present invention also relates to a computer program product including a computer readable medium having recorded thereon a computer program for encoding and decoding video data.

BACKGROUND

Many applications for video coding currently exist, including applications for transmission and storage of video data. Many video coding standards have also been developed and others are currently in development. Recent developments in video coding standardisation have led to the formation of a group called the "Joint Collaborative Team on Video Coding" (JCT-VC). The Joint Collaborative Team on Video Coding (JCT-VC) includes members of Study Group 16, Question 6 (SG16/Q6) of the Telecommunication Standardisation Sector (ITU-T) of the International Telecommunication Union (ITU), known as the Video Coding Experts Group (VCEG), and members of the International Organisations for Standardisation/International Electrotechnical Commission Joint Technical Committee 1/Subcommittee 29/Working Group 11 (ISO/IEC JTC1/SC29/WG11), also known as the Moving Picture Experts Group (MPEG).

The Joint Collaborative Team on Video Coding (JCT-VC) has produced a new video coding standard that significantly outperforms the "H.264/MPEG-4 AVC" video coding standard. The new video coding standard has been named "high efficiency video coding (HEVC)". Further development of an extension to high efficiency video coding (HEVC) is directed towards improving compression efficiency for a category of video data sometimes referred to as 'screen content'. Screen content includes video data produced from devices such as personal computers. Such content is characterised by lots of high frequency content (i.e. sharp edges). Such content is generally not compressed very well by traditional transform-based video compression techniques. Generally transform-based video compression introduces substantial artifacts which reduces the subjective quality of the decoded video data. Although high efficiency video coding (HEVC) supports some tools to assist in compressing such content, further tools are under study within the joint collaborative team on video coding (JCT-VC) for possible inclusion into a future amendment of high efficiency video coding (HEVC). Efficient coding of screen content is highly desirable for applications such as remote desktop, cloud gaming and virtualisation and wireless HDMI, as high resolution screen displays need to be transmitted over networks having limited or otherwise costly bandwidth.

Video data includes one or more colour channels. Typically three colour channels are supported and colour information is represented using a 'colour space'. One example colour space is known as 'YCbCr', although other colour spaces are also possible. The 'YCbCr' colour space enables fixed-precision representation of colour information and thus is well suited to digital implementations. The 'YCbCr' colour space includes a 'luma' channel (Y) and two 'chroma' channels (Cb and Cr). Each colour channel has a particular bit-depth. The bit-depth defines the width of samples in the respective colour channel in bits. Generally, all colour channels have the same bit-depth, although having different bit-depths is also possible. The relationship between the spatial sampling of the luma channel and the spatial sampling of the chroma channels is referred to as the 'chroma format'. When a '4:4:4' chroma format is used, the chroma channels are spatially sampled with the same frequency as the luma channel. When a '4:2:0' or a '4:2:2' chroma format is selected, the chroma channels are sampled less frequently than the luma channel. In the case of 4:2:0, one chroma sample in each chroma channel is present for every 2×2 set of luma samples. In the case of 4:2:2, one chroma sample in each chroma channel is present for every 2×1 set of luma samples.

In high efficiency video coding (HEVC), there are three types of prediction available: intra-prediction, intra block copy prediction and inter-prediction. Intra-prediction methods allow content of one part of a video frame to be predicted from other parts of the same video frame. Intra-prediction methods typically produce a block having a directional texture, with an intra-prediction mode specifying the direction of the texture and neighbouring samples within a frame used as a basis to produce the texture. Intra block copy prediction allows a spatially local block of samples from the current frame to be used as a prediction for a current block. Inter-prediction methods allow the content of a block within a video frame to be predicted from blocks in previous video frames. The previous video frames (i.e. in 'decoding order' as opposed to 'display order' which may be different) are referred to as 'reference frames'. Blocks in the first frame of a sequence typically use intra-prediction or intra block copy mode. Inter-prediction is not available to such blocks because no reference frame(s) are available. To maximise coding efficiency, the prediction method that produces a predicted block that is closest to captured frame data is typically used. The remaining difference between the predicted block and the captured frame data is known as the 'residual'. This spatial domain representation of the difference is generally transformed into a frequency domain representation and quantised. Generally, the frequency domain representation compactly stores the information present in the spatial domain representation for 'natural content', i.e. content that was captured by an imaging sensor. The frequency domain representation includes a block of 'residual coefficients' that results from applying a transform, such as an integer discrete cosine transform (DCT). Moreover, the residual coefficients (or 'scaled transform coefficients') are quantised, which introduces loss but also further reduces the amount of information required to be encoded in a bitstream. The lossy frequency domain representation of the residual, also known as 'transform coefficients', may be stored in the bitstream. The amount of lossiness in the residual recovered in a decoder affects the distortion of video data decoded from the bitstream compared to the captured frame data and the size of the bitstream.

A video bitstream includes a sequence of encoded syntax elements. The syntax elements are ordered according to a hierarchy of 'syntax structures'. Each syntax element is composed of one or more 'bins', which are encoded using a 'context adaptive binary arithmetic coding' (CABAC) algorithm. A given bin may be 'bypass' coded, in which case there is no 'context' associated with the bin. Alternatively, a bin may be 'context' coded, in which case there is context associated with the bin. Each context coded bin has one context associated with the bin, selected from a set of one or more contexts from a context memory. The selected context is retrieved from a context memory and each time a context is used (i.e. selected), the context is also updated and then stored back in the context memory. When encoding or decoding the bin, prior information available in the bitstream is used to select which context to use. Context information in the decoder necessarily tracks context information in the encoder (otherwise a decoder could not parse a bitstream produced by an encoder). The context includes two parameters: a likely bin value (or 'valMPS') and a probability level (or 'pStateIdx'). A syntax element with two distinct values may also be referred to as a 'flag' and is generally encoded and decoded using one context coded bin. A syntax element with more distinct values requires more than one bin, and may use a combination of context coded bins and bypass coded bins. In the high efficiency video coding (HEVC) standard, syntax elements are grouped into syntax structures. A given syntax structure defines the possible syntax elements that can be included in the video bitstream and the circumstances in which each syntax element is included in the video bitstream. Each instance of a syntax element contributes to the size of the video bitstream. An objective of video compression is to enable representation of a given sequence using a video bitstream and having minimal size (e.g. in bytes) for a given quality level, i.e. distortion of the output frames compared to the input frame data for lossy encoding. At the same time, video decoders are invariably required to decode video bitstreams in real time, placing limits on the complexity of the algorithms that can be used. As such, a trade-off between algorithmic complexity and compression performance is made. In particular, modifications that can improve or maintain compression performance while reducing algorithmic complexity are desirable.

Coding tools that achieve improvement in coding screen content are desirable, however the complexity of new coding tools (in particular for real-time and low-cost implementation) must be balanced against the coding improvement obtained.

SUMMARY

According to the present disclosure, a further approach to the production of prediction units (PUs) in HEVC is proposed. This further approach, which is additional to existing HEVC inter-prediction, intra-prediction, and intra block copy prediction, implements what the present inventor has termed "dictionary" block copy. With this mode of operation, select blocks of reconstructed samples are held in a "dictionary" memory and, subject to the prediction mode of the coding units, rather than traditionally retrieving blocks defined by the prediction mode under an intra block copy operation, the select blocks are retrieved from the dictionary memory. Selection of the blocks for storage in the dictionary memory is preferably independent of the prediction mode. Preferably the blocks stored in the dictionary memory are those that are that were predicted using intra-block copy mode for the frame. Experiments by the present inventor have shown this approach can reveal significant, if not substantial, improvements in coding speed at the expense of a relatively small amount of memory which, in integrated implementations, results in a slightly larger chip size.

According to one aspect of the present disclosure there is provided a method of decoding a coding unit from a video bitstream, comprising:

determining reconstructed samples for a first coding unit, from the video bitstream;

decoding a dictionary store flag from the video bitstream for the first coding unit; and where the dictionary store flag indicates that reconstructed samples for the first coding unit be stored:

storing the reconstructed samples for the first coding unit into a memory buffer;

determining reconstructed samples for a second coding unit, the reconstructed samples for the second coding unit being copied from reconstructed samples for the first coding unit from the memory buffer; and outputting the reconstructed samples for the second coding unit.

Desirably a dictionary store location is decoded from the video bitstream to indicate where to store the reconstructed samples for the first coding unit in the memory buffer. Preferably the memory buffer is arranged as an array of samples. In a specific implementation the dictionary store location specifies the location as a two-dimensional vector.

In another implementation the second coding unit uses a dictionary block copy prediction mode. Here, desirably a dictionary load location specifies the location in the memory buffer from which to copy the reconstructed samples for the second coding unit.

Preferably, setting of the dictionary store flag indicates that reconstructed samples for a coding unit are available for decoding a subsequent coding unit. Advantageously, reconstructed samples stored in the dictionary block memory buffer are those samples produced by intra-block copy prediction.

According to another aspect of the present disclosure, provided is a method of encoding a coding unit into a video bitstream, comprising:

determining reconstructed samples for a first coding unit from video frame data;

establishing a dictionary store flag indicating that reconstructed samples for the first coding unit are stored, the dictionary store flag being associated with the first coding unit; and where the dictionary store flag indicates that reconstructed samples are stored:

storing reconstructed samples for the first coding unit in a dictionary block memory buffer;

determining reconstructed samples for a second coding unit, the reconstructed samples for the second coding unit being copied from reconstructed samples for the first coding unit from the memory buffer; and outputting the reconstructed samples for the second coding unit in the bitstream.

Preferably the dictionary store flag is encoded in the bitstream. Desirably the stored reconstructed samples comprise reconstructed samples used for intra block copy predicted encoding of the first coding unit.

Also disclosed is a computer readable storage medium having a program recorded thereon, the program being executable by a processor to perform a method according to the above.

Also disclosed is a video decoder adapted to decode a coding unit from a video bitstream, the decoder comprising:

reconstruction apparatus adapted to determine reconstructed samples and decode a dictionary store flag for a first coding unit, from the video bitstream; and a dictionary block copy module adapted, where the dictionary store flag indicates that reconstructed samples for the first coding unit be stored, to:

store the reconstructed samples for the first coding unit into a memory buffer;

determine reconstructed samples for a second coding unit, the reconstructed samples for the second coding unit being copied from reconstructed samples for the first coding unit from the memory buffer; and output the reconstructed samples for the second coding unit.

Also disclosed is a video encoder for encoding a coding unit into a video bitstream, the video encoder comprising:

reconstruction apparatus adapted to determining reconstructed samples for a first coding unit from video frame data;

a dictionary block selector adapted to establish a dictionary store flag indicating that reconstructed samples for the first coding unit are stored, the dictionary store flag being associated with the first coding unit; and a dictionary block copy module adapted, where the dictionary store flag indicates that reconstructed samples are stored, to:

store reconstructed samples for the first coding unit in a dictionary block memory buffer;

determine reconstructed samples for a second coding unit, the reconstructed samples for the second coding unit being copied from reconstructed samples for the first coding unit from the memory buffer; and output the reconstructed samples for the second coding unit in the bitstream.

Other aspects are also disclosed.

BRIEF DESCRIPTION OF THE DRAWINGS

At least one embodiment of the present invention will now be described with reference to the following drawings and appendices, in which:

FIG. 5A is a schematic representation of an exemplary coding tree unit (CTU);

FIGS. 5B(1) to 5B(4) are schematic representations of PART_N×N, PART_2N×2N, PART_2N×N and PART_N× 2N partition modes, respectively;

FIGS. 7A(1) and 7A(2) are schematic representations of an example coding unit (CU) predicted by a block of samples from within a neighbouring coding tree block (CTB);

FIGS. 7B(1) and 7B(2) are schematic representations of an example coding unit (CU) predicted by a block of samples from a dictionary memory;

DETAILED DESCRIPTION INCLUDING BEST MODE

Figure 1:
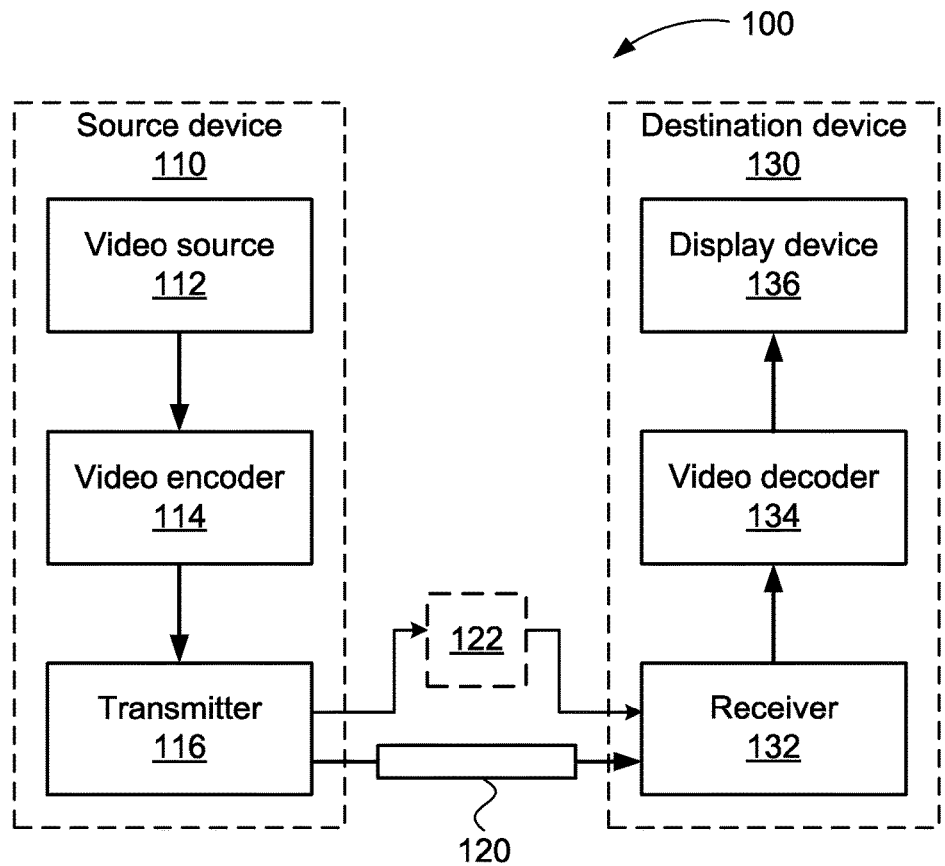
FIG. 1 is a schematic block diagram showing a video encoding and decoding system.

Where reference is made in any one or more of the accompanying drawings to steps and/or features, which have the same reference numerals, those steps and/or features have for the purposes of this description the same function(s) or operation(s), unless the contrary intention appears.

Described herein is a video encoder and video decoder supporting a prediction mode referred to as 'dictionary block copy mode'. This mode has two operations, referred to as a 'dictionary store operation' and a 'dictionary load operation'. The dictionary store operation is applicable to any prediction unit (PU) and results in storing reconstructed samples for the prediction unit (PU) into a dictionary block memory buffer. The dictionary load operation is a prediction mode as it produces a prediction unit (PU). The prediction unit (PU) is produced by copying a block of samples from the dictionary block memory buffer. Separate dictionary block memory buffers are maintained in the video encoder and in the video decoder. Signalling in the video bitstream ensures that the contents of the dictionary block memory buffer in the video decoder are synchronised (i.e. matches) the contents of the dictionary block memory buffer in the video encoder. A dictionary store operation is performed on a first coding unit (CU), resulting in storing the reconstructed samples of a prediction unit (PU) associated with the coding unit (CU) into the dictionary block memory buffer. A dictionary load operation is then performed on a second coding unit (CU), resulting in producing a prediction unit (PU) for the second coding unit using samples that were previously stored in the dictionary block memory buffer. As the first coding unit (CU) and the second coding unit (CU) can be spaced far apart in the video frame data, it is possible to predict a portion of the frame using data from another, distant, portion of the video frame data.

FIG. 1 is a schematic block diagram showing function modules of a video encoding and decoding system 100. The system 100 utilises techniques for a block-based dictionary prediction mode to improve compression efficiency. The system 100 includes a source device 110 and a destination device 130. A communication channel 120 is used to communicate encoded video information from the source device 110 to the destination device 130. In some arrangements, the source device 110 and destination device 130 may comprise respective mobile telephone hand-sets, in which case the communication channel 120 is a wireless channel. In other arrangements, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over the air television broadcasts, cable television applications, internet video applications and applications where encoded video data is captured on some storage medium or a file server.

As shown in FIG. 1, the source device 110 includes a video source 112, a video encoder 114 and a transmitter 116. The video source 112 typically comprises a source of captured video frame data, such as an imaging sensor, a previously captured video sequence stored on a non-transitory recording medium, or a video feed from a remote imaging sensor. Examples of source devices 110 that include an imaging sensor as the video source 112 include smart-phones, video camcorders and network video cameras. The video encoder 114 converts the captured frame data from the video source 112 into encoded video data and will be described further with reference to FIG. 3. The encoded video data is typically an encoded bitstream and is transmitted by the transmitter 116 over the communication channel 120 as encoded video data (or "encoded video information"). It is also possible for the encoded video data to be stored in a non-transitory storage device 122, such as a "Flash" memory or a hard disk drive.

The destination device 130 includes a receiver 132, a video decoder 134 and a display device 136. The receiver 132 receives encoded video data from the communication channel 120 and passes received video data to the video decoder 134. The video decoder 134 then outputs decoded frame data to the display device 136. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device.

Figure 2A:
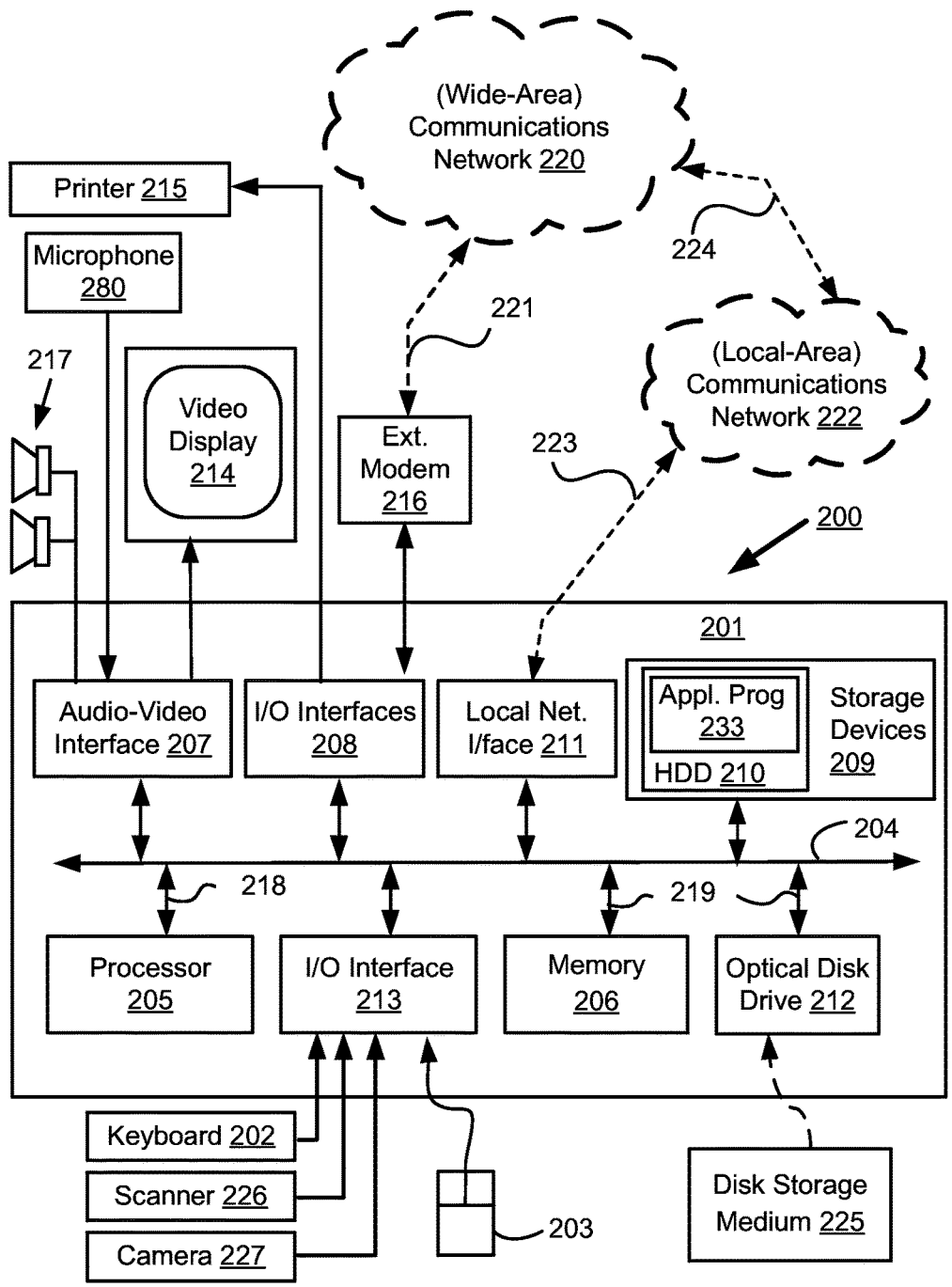
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu-ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 130 of the system 100, or the source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practiced include IBM-PC's and compatibles, Sun SPARCstations, Apple Mac™ or alike computer systems.

Where appropriate or desired, the video encoder 114 and the video decoder 134, as well as methods described below, may be implemented using the computer system 200 wherein the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
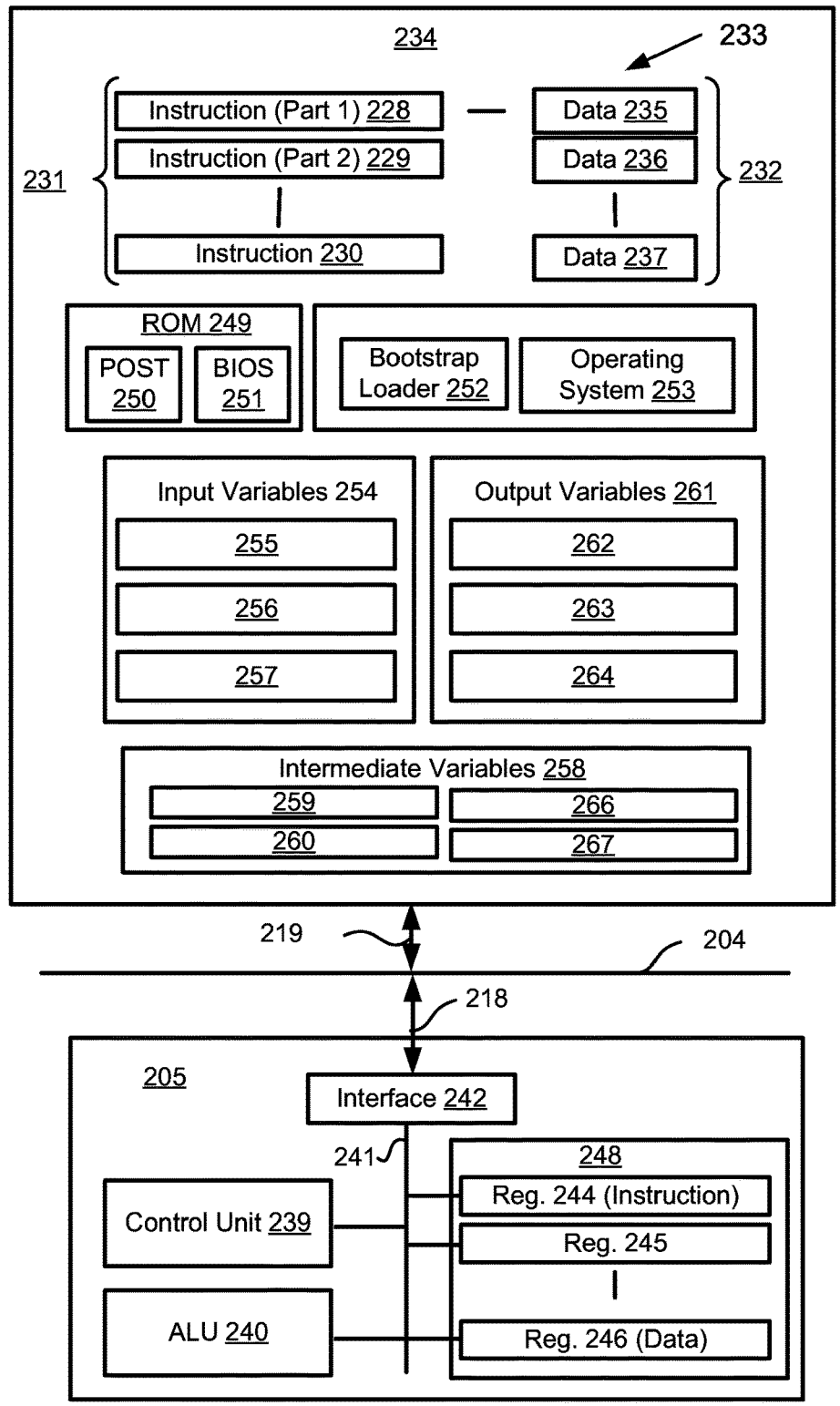

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the methods FIGS. 10A, 10B, 11A, 11B to be described is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 3:
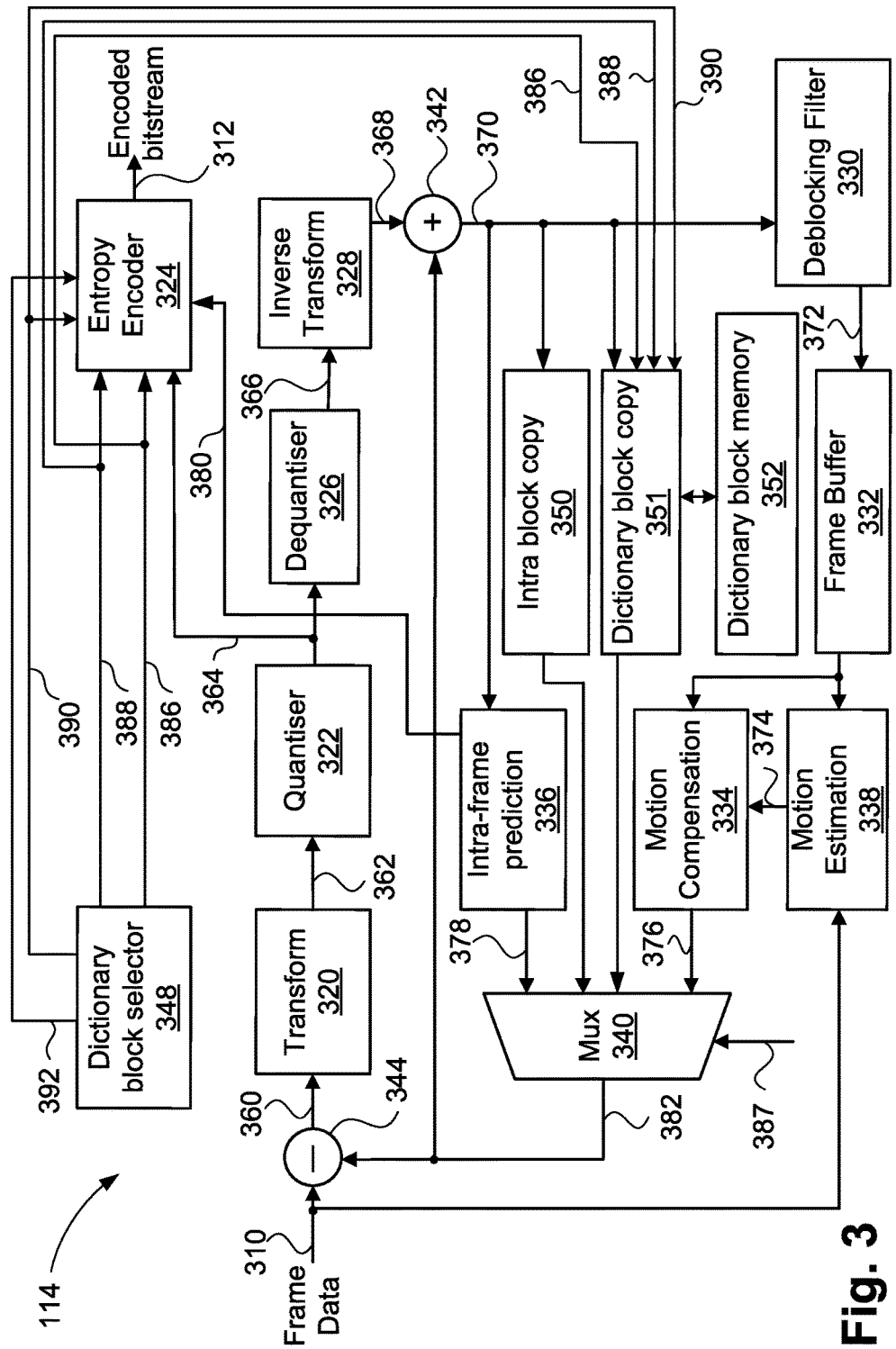
FIG. 3 is a schematic block diagram showing functional modules of a video encoder.
Figure 4:
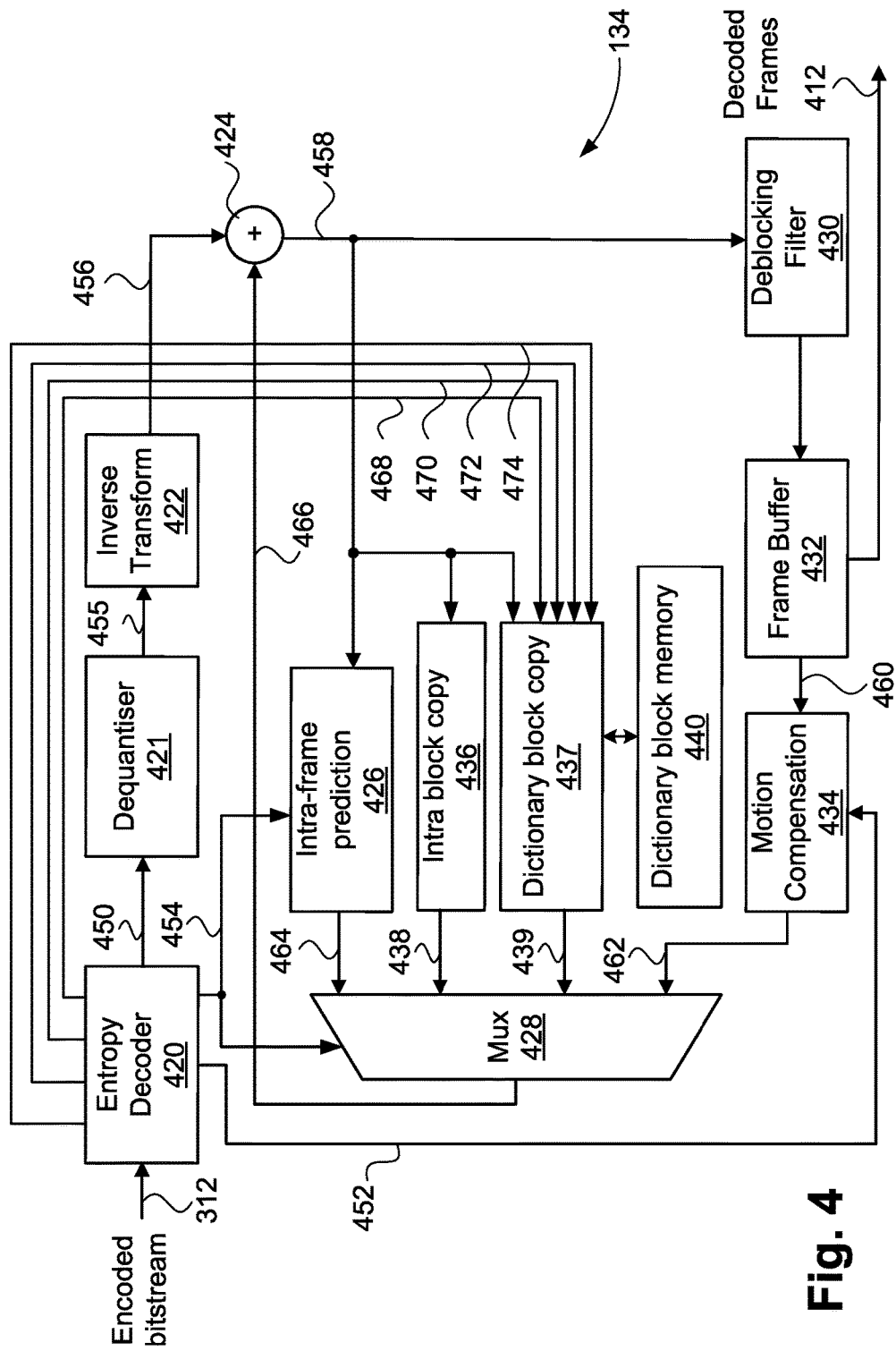
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. Generally, data is passed between functional modules within the video encoder 114 and the video decoder 134 in blocks or arrays (e.g., blocks of samples or blocks of transform coefficients). Where a functional module is described with reference to the behaviour of individual array elements (e.g., samples or a transform coefficients), the behaviour shall be understood to be applied to all array elements. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205, or alternatively by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processors, digital signal processors, application specific integrated circuits (ASICs), field programmable gate arrays (FPGAs) or one or more microprocessors and associated memories. In particular the video encoder 114 comprises modules 320-352 and the video decoder 134 comprises modules 420-437 which may each be implemented as one or more software code modules of the software application program 233.

Although the video encoder 114 of FIG. 3 is an example of a high efficiency video coding (HEVC) video encoding pipeline, the processing stages described herein may also be performed to implement other video codecs. The video encoder 114 receives captured frame data, such as a series of frames from the video source 112, each frame including one or more colour channels.

The video encoder 114 divides each frame of the captured frame data, such as frame data 310, into square regions generally referred to as 'coding tree units' (CTUs), generally having a size of 16×16, 32×32 or 64×64 luma samples. The notion of coding tree unit (CTU) refers collectively to all colour channels of the picture. Every coding tree unit (CTU) includes individual coding tree blocks (CTBs) for each colour channel. For example in a frame coded using the YCbCr colour space, a coding tree unit (CTU) will consist of three coding tree blocks (CTBs) for Y, Cb and Cr colour planes corresponding to the same spatial location in the picture. The size of individual coding tree blocks (CTBs) is dependent on the coding tree unit (CTU) size and the chroma format. For example, for the 4:4:4 chroma format, the sizes of the coding tree blocks (CTBs) will be the same across all colour channels. For the 4:2:0 chroma format the sizes of chroma coding tree blocks (CTBs) will be half the dimensions of the corresponding luma coding tree block (CTB). Generally, the size of coding tree units (CTUs) is stated in terms of luma samples, even though the coding tree blocks (CTBs) associated with the chroma channels may have different dimensions, depending on the selected chroma format.

Each coding tree unit (CTU) includes a hierarchical quad-tree subdivision of a portion of the frame with a collection of 'coding units' (CUs), such that at each leaf node of the hierarchical quad-tree subdivision one coding unit (CU) exists. The subdivision can be continued until the coding units (CU) present at the leaf nodes of a specific minimum size are reached. This size is referred to as a smallest coding unit (SCU) size. Generally, the smallest coding unit (SCU) size is 8×8, but other sizes are also possible, such as 16×16 or 32×32. Note that the size of a coding unit (CU) is specified in units of luma samples. The corresponding coding block (CB) for the luma channel will thus have the same dimensions as the coding unit (CU). The corresponding coding blocks (CBs) for the chroma channels will have dimensions scaled according to the chroma sub-sampling size. For example, when a 4:2:0 chroma format is in use, an 8×8 coding unit (CU) includes a 4×4 coding block (CBs) for each chroma channel. A quad-tree subdivision of a coding tree unit (CTU) implies subdivision of coding tree blocks (CTBs) for each colour channel into four 'coding blocks' (CBs) of equal size. For example if a coding tree unit (CTU) of a frame encoded using the "4:2:0" colour component scaling mode, of size 64×64 samples is split, this will imply that a corresponding luma coding tree block (CTB) is split into four coding blocks (CBs) of 32×32 samples, and a corresponding chroma coding tree blocks (CTBs) (having size of 32×32 samples) will be split into four coding blocks (CBs) of 16×16 samples. Coding blocks (CBs) corresponding to smallest coding units (SCUs) are referred to as smallest coding blocks (SCBs). Coding blocks (CBs) corresponding to largest coding units (LCUs) are referred to as largest coding blocks (LCBs).

In the HEVC standard a coding tree unit (CTU) has size 64×64 samples, although other sizes are possible, such as 16×16 or 32×32. In some cases even larger sizes for the coding tree unit (CTU), such as 128×128 samples, may be used.

The video encoder 114 divides the incoming frame data 310 into a sequence of coding tree units (CTUs). The video encoder 114 further divides each coding tree unit (CTU) into one or more coding units (CUs). Each coding unit is associated with one or more prediction units (PUs) 382.

A prediction mode 387 selects which type or method of prediction is used to produce the prediction units (PUs) 382. Various arrangements of prediction units (PUs) in each coding unit (CU) are possible, known as 'partition modes', with a requirement that the prediction units (PUs) do not overlap and that the entirety of the coding unit (CU) is occupied by the one or more prediction units (PUs). Such a requirement ensures that the prediction units (PUs) cover the entire frame area. A partitioning of a coding unit (CU) into prediction units (PUs) implies subdivision of coding blocks (CBs) for each colour component into 'prediction blocks' (PBs). Depending on used colour component scaling mode, the sizes of prediction blocks (PBs) corresponding to the same coding unit (CU) for different colour component may differ in size.

A multiplexer module 340 outputs the prediction unit (PU) 382 according to the selected prediction mode 387. A difference module 344 produces a 'residual sample array' 360. The residual sample array 360 is the difference between the prediction unit (PU) 382 and a corresponding 2D array of data samples from a coding unit (CU) of the coding tree unit (CTU) of the frame data 310. The difference is calculated for corresponding samples at each location in the arrays. The video encoder 114 tests the various prediction modes in order to select one that results in minimising the sum of absolute magnitude of values in the residual sample array 360. For each prediction mode, generally multiple candidates are tested. For example, when testing intra-prediction, multiple intra-prediction modes are available and generally several (or all) modes are tested in order to select an optimal mode.

The residual sample array 360 is either transformed into the frequency domain in a transform module 320 to produce scaled transform coefficients 362 or left as spatial domain by bypassing the transform operation of the transform module 320. Bypassing the transform operation is beneficial for blocks with lots of high-frequency information (e.g. irregular sharp edges), as transforming generally provides no compression benefit for such blocks. The residual sample array 360 from the difference module 344 is received by the transform module 320. The transform module 320 converts the residual sample array 360 from a spatial representation to a frequency domain representation by applying a 'forward transform'. Moreover, the coding unit (CU) may be subdivided into more than one 'transform units' (TUs). A quad-tree division of the coding unit (CU), known as a 'residual quad-tree' or a 'transform tree' is applied. In such cases, multiple smaller transforms are used to convert the residual coefficient array 360 into multiple sets of scaled transform coefficients 362.

The scaled transform coefficients 362 are input to the quantiser module 322 where data sample values thereof are scaled and quantised to produce transform coefficients 364. The transform coefficients 364 are an array of values having the same dimensions as the residual sample array 360. The transform coefficients 364 provide a frequency domain representation of the residual sample array 360 when a transform is applied. The quantisation process reduces the magnitude of each scaled transform coefficient, resulting in a reduction in the signal magnitude required to be encoded, at the expense of reducing the precision achievable when the quantisation process is reversed. The transform coefficients 364 are input to the dequantiser module 326. The dequantiser module 326 reverses the scaling performed by the quantiser module 322 to produce rescaled transform coefficients 366. The rescaled transform coefficients 366 are rescaled versions of the transform coefficients 364, however the rescaled transform coefficients 366 are not identical to the transform coefficients 364 due to the loss of information in the quantiser module 322. The transform coefficients 364 are also input to an entropy encoder module 324. The entropy encoder module 324 encodes 'syntax elements', such as the values of the transform coefficients 364 in an encoded bitstream 312 (or 'video bitstream'). The rescaled transform coefficients 366 from the dequantiser module 326 are then provided to an inverse transform module 328. The inverse transform module 328 performs an inverse transform from the frequency domain to the spatial domain to produce a spatial-domain representation 368 of the rescaled transform coefficients 366. The spatial-domain representation 368 is identical to a spatial domain representation that is produced in the video decoder 134, allowing the video encoder 114 to perform prediction operations based on identical information to that available in the video decoder 134.

The spatial-domain representation 368 is then input to a summation module 342. The summation module 342 adds the samples of the spatial domain representation 368 and the prediction units 382 to produce reconstructed samples 370. The process of adding the spatial domain representation 368 of the residual coefficients to the samples of the prediction units (PUs) is known as 'reconstruction'. Memory storage for reconstruction is generally located on-chip in ASIC or FPGA implementations due to the high memory bandwidth requirements for this stage. For prediction modes where the content of one prediction unit (PU) depends on the reconstructed samples from one or more adjacent prediction units (PUs), the summation module 342 operates on each prediction unit (PU) independently. As such the transform module 320, quantiser module 322, dequantiser 326, the inverse transform module 328 and summation module 342 collectively form reconstruction apparatus by which the reconstructed samples 370 are formed for encoding into the bitstream 312.

Several prediction modes are available, as selected by the multiplexor module 340. For a given prediction unit (PU), only one mode of prediction is applied, as only one block of samples is required to populate the prediction unit (PU). The prediction modes are as follows:

For inter-prediction, a motion estimation module 338 produces motion vectors 374 by comparing the frame data 310 with previous frame data from one or more sets of frames stored in a frame buffer module 332, generally configured within the memory 206. Generally a set of motion vectors are tested and the optimal one is selected. Each motion vector includes an X and Y co-ordinate and references one or more previous frames in the frame buffer module 332. Performing a full search of this space would take a very long time and result in huge memory bandwidth to the frame buffer module 332 and is thus undesirable. Generally, the video encoder 114 searches a small sub-set of the available motion vectors in order to make a reasonable decision in a short time-frame. The motion vectors 374 are then input to a motion compensation module 334 which produces an inter-predicted prediction unit (PU) 376 by filtering data samples stored in the frame buffer module 332, taking into account a spatial offset derived from the motion vectors 374. Not illustrated in FIG. 3, the motion vectors 374 are also passed to the entropy encoder module 324 for encoding in the encoded bitstream 312. The motion vectors are encoded as 'motion vector differences', i.e. differences between the motion vector for a current block and a neighbouring block.

For intra-prediction, the intra-frame prediction module 336 produces an intra-predicted prediction unit (PU) 378 using reconstructed samples 370 obtained from the summation module 342. Reconstructed samples 370 along the left, above-left and above edges of the prediction unit (PU) are considered as available if those samples are within the frame and in the same slice and tile as the prediction unit (PU). As the reconstructed samples 370 are from the same frame, intra-prediction is considered an 'intra-frame' method of prediction. Reconstructed samples that are available are used to produce intra-predicted samples for the prediction unit (PU). In particular, the intra-frame prediction module 336 uses samples from neighbouring blocks that have already been reconstructed to produce intra-predicted samples for the current prediction unit (PU). In high efficiency video coding (HEVC) there are 33 'directional' intra-prediction modes, a 'DC' and a 'planar' intra-prediction mode. The intra-frame prediction module 336 generally tests multiple intra-prediction modes, selecting one that results in minimising the residual sample array 360. The selected intra-prediction mode 380 is sent to the entropy encoder 324 for encoding into the encoded bitstream 312.

For the intra block copy prediction mode, an intra-block copy module 350 tests various block vectors to produce an optimal reference block for the prediction unit (PU) 382. The reference block is obtained from reconstructed samples 370 from the current coding tree block (CTB) and/or a region to the left of the current coding tree block (CTB). The reference block cannot include samples from any coding blocks (CBs) in the current coding tree block (CTB) that have not yet been reconstructed (and hence are not available in the reconstructed samples 370). In a 'full search', the intra block copy module 350 tests every valid block vector by testing all possible reference blocks. As with inter-prediction, full search methods of block vectors are not suitable for real-time implementation and rarely satisfactory for non-real-time implementations. 'Fast search' approaches to the search are generally preferable. In one example of a fast search, the intra block copy module 350 searches a reduced search space by only searching for block vectors aligned horizontally or vertically to the current coding block (CU). In another example of a fast search, near-horizontal and near-vertical block vectors are tested. In yet another example of a fast search, the intra block copy module 350 tests a spatially sparse set of block vectors and then performs a refined search in the neighbourhood of the optimal one of the sparse block vectors to produce a final block vector. Entropy coding the block vector has an associated cost, or rate. One approach to entropy coding the block vector is to reuse the motion vector delta (i.e. 'mvd_coding') syntax structure. This syntax structure permits encoding a two-dimensional signed vector and is thus suitable for a block vector. In this approach, the block vector is coded directly into the bitstream using the motion vector delta syntax structure. In another approach, correlations between adjacent block vectors are exploited. For example, in such an approach, the delta (difference) between the block vector of consecutive blocks (i.e. consecutive in the Z-scan order described with reference to FIGS. 6A and 6B) using the intra block copy mode is coded into the encoded bitstream 312. In such cases, the decoder can reconstruct the block vector for a given coding block (CB) by adding the decoded delta block vector to the block vector of the previous coding block (CTB) to use intra block copy mode. Finally, an 'intra_bc_flag' syntax element signals that a given coding block (CB) uses the intra block copy mode. The mvd_delta syntax structure encodes smaller magnitude vectors more compactly than larger magnitude vectors. A given block vector results in a particular reference block having a particular distortion. The rate-distortion trade-off is applied to determine the optimal block vector for an intra-block copy mode.

For dictionary block copy prediction, a dictionary block copy module 351 stores blocks of the reconstructed samples 370 into a dictionary block memory buffer 352 and tests blocks held in a dictionary block memory buffer 352 to select an optimal reference block for the prediction unit (PU) 382. For each prediction unit (PU) 382, a selection criteria is applied to the corresponding block of reconstructed samples 370. The selection criteria indicates whether the reconstructed samples 370 should be stored in the dictionary block memory 352. An exemplary selection criteria is described later with reference to FIG. 13. In the intra block copy module 350, every block of reconstructed samples 370 for a spatially local region of generally two coding tree units (CTUs) is retained for possible later use (FIGS. 8A-8D show the exact storage capacity for reconstructed samples 370 available for the intra block copy mode). In contrast, for the video encoder 114 with the dictionary block copy module 351, a dictionary store flag 388 signals whether the reconstructed samples 370 for the current prediction unit (PU) should be stored in the dictionary block memory 352 (e.g. dictionary store flag 388 is equal to one), or that the reconstructed samples 370 should not be stored in the dictionary block memory 352 (e.g. dictionary store flag 388 is equal to zero).

Figure 13:
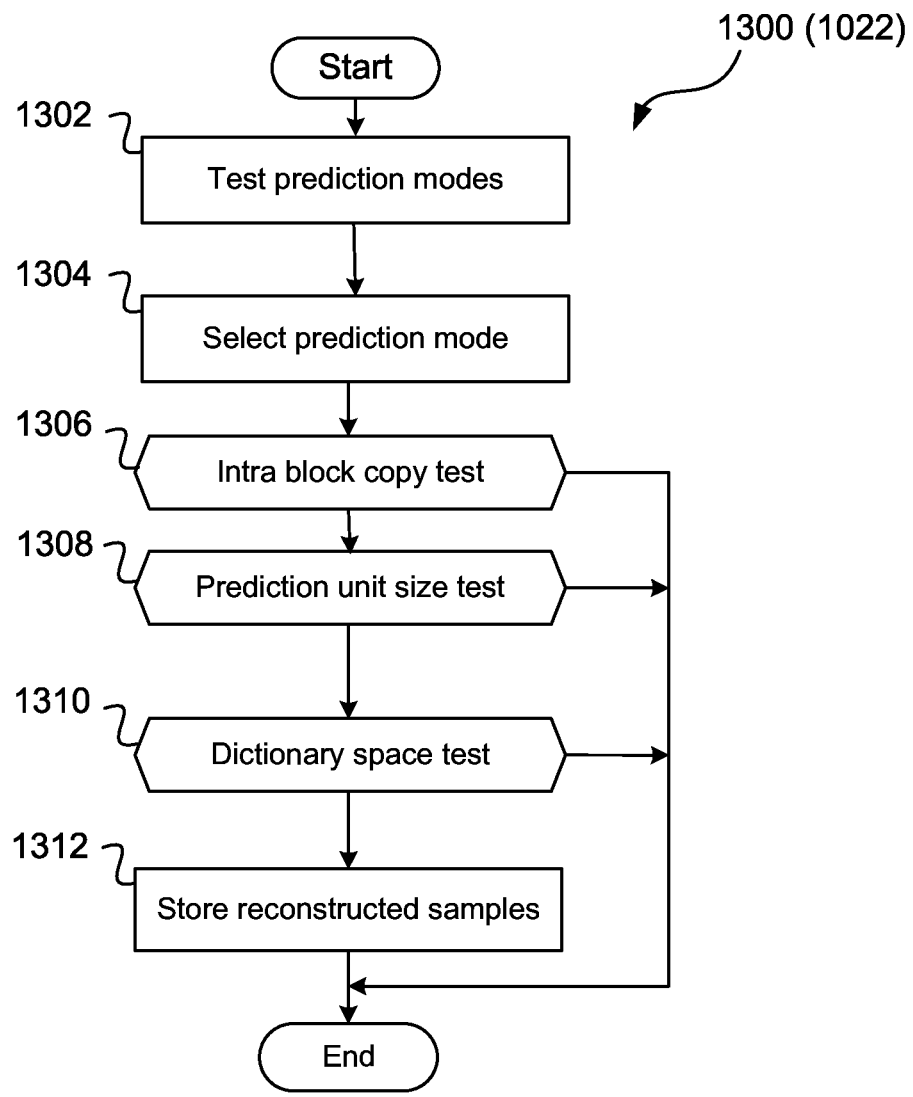
FIG. 13 is a schematic flow diagram showing a method for determining whether to store reconstructed samples into a dictionary block memory; and Appendix 1 provides a syntax table according to the HEVC standard modified according to the modifications and variations disclosed herein.

The value of the dictionary store flag 388 is determined by the processor 205, for example in accordance with the process of FIG. 13 to be described. By storing a block of reconstructed samples 370 into the dictionary block memory 352, it is not necessary to send the block of samples to be stored 'out of band' in the encoded bitstream 312 (i.e. as an overhead block that is not part of a frame). A dictionary block selector 348 operates to ascertain which of the reconstructed samples 370 is to be stored in the dictionary block memory 352 via the dictionary block copy module 351. This is signalled by the dictionary block selector 348 using the dictionary store flag 388 and issuing a dictionary block address 392 to specify the storage location of the current reconstructed sample 370 in the dictionary block memory 352. The dictionary store flag 388 and the dictionary block address 392 are also provided to the entropy encoder 324 for encoding into the bitstream 312. Operation of the dictionary block selector 348 is described later with reference to FIG. 13. As such, the block of samples to be stored in the dictionary block memory 352 corresponds to a block of reconstructed samples that will ultimately be output in decoded frames 412 (after filtering) (see FIG. 4 to be described). Moreover, the block to be stored in the dictionary block memory 352 is coded into the encoded bitstream 312 using pre-existing techniques present in high efficiency video coding (HEVC), such as transform blocks or transform skipped blocks and any supported intra-prediction mode. Moreover, new syntax elements to encode the block to be stored into the encoded bitstream 312 are not necessary.

The decision to store a block of reconstructed samples for a prediction unit (PU) in the dictionary block memory 352 is independent of the prediction mode of the prediction unit (PU) and thus, in one arrangement, the dictionary store flag 388 is signalled independently of the prediction mode. Inter-predicted blocks with no motion vector delta and no non-zero residual coefficients are coded using 'skipped' blocks. A skipped block is a block for which no other syntax elements are present in the encoded bitstream 312, other than the signalling to indicate that the block was skipped. For skipped blocks, there is no need to provide a dictionary store flag 388 because the block that would be stored into the dictionary block memory 352 is already available for reference in the frame buffer 332 and so there is no need to provide the ability to store the block into the dictionary block memory 352 and so the dictionary store flag 388 signals the inactive state in this case. Then, an arrangement of the video encoder 114 and the video decoder 134 omits encoding the dictionary store flag 388 into the encoded bitstream 312 for skipped prediction unit (PU) (instead the flag is inferred to be inactive or zero), avoiding introducing any signalling overhead to these skipped blocks.

For a prediction unit (PU) that is signalled to be stored in the dictionary block memory buffer 352, a block index is determined to indicate where the block should be stored. In one arrangement, the block index is signalled in the encoded bitstream 312. As the block index signalling granularity is one block index per prediction unit, the worst case signalling overhead is one block index per prediction unit (PU), which is comparable to the signalling overhead of intra-prediction (one prediction mode per prediction unit) and intra-block copy (one block vector delta per prediction unit). For example, with a minimum prediction unit size of 4×4 samples, the worst case is one block index per 4×4 block or 256 block indices per 64×64 coding tree unit (CTU). This cost is approximately equivalent to the case of intra-prediction, where one explicit prediction mode (i.e. not predicted) is coded per prediction unit (PU). In another arrangement, an allocation algorithm is applied to determine a storage location. In such arrangements, the same allocation algorithm is applied in the video encoder 114 and the video decoder 134 to ensure synchronised operation of the system 100. If the dictionary becomes full, it is necessary to evict a block from the dictionary block memory 352 in order to add an additional block. One example of an eviction strategy is to apply a 'least recently used' approach to select a block for eviction (i.e. overwriting with a new block). In such arrangements, no block index is required to be stored into the encoded bitstream 312, as the location can also be determined based on information available to the video decoder 134. The selection criterion is described further with reference to FIG. 13.

The dictionary block copy operation produces prediction units (PUs) using samples from the same frame. Such behaviour is categorised as an intra-frame method of prediction. For intra-frame prediction, a prediction unit (PU) does not use reconstructed samples 370 from a different slice or tile than the slice or tile of the current prediction unit (PU). Thus, when a slice or tile boundary is crossed, blocks previously stored in the dictionary block memory 352 are no longer read. For testing of blocks stored in the dictionary block memory 352, the dictionary block copy module 351 behaves in a manner similar to the intra block copy module 350. As such, various blocks are compared against the corresponding block of the frame data 310, to determine which block provides the closest match (i.e. the lowest distortion). The cost of coding the block location is generally also considered, as a block location is required to be encoded into the encoded bitstream 312. Generally, the overall cost is determined by the function distortion (e.g. sum-of-absolute-differences) plus the result of a constant lambda multiplied by rate (e.g. bit-cost of the candidate encoding decisions). As such, varying the parameter 'lambda' alters the relative weighting of distortion versus rate.

The dictionary block memory 352 can be treated as a two-dimension array of samples, e.g. equal in size to one coding tree unit (CTU), capable of holding blocks of various sizes. If PART_2N×2N is the only available partition mode for prediction units (PUs) using dictionary block copy mode, then the smallest block size is equal to the smallest coding unit (SCU) size, which is generally 8×8. If PART_N×N partition mode is available for prediction units (PUs) using dictionary block copy mode, then the smallest block size is equal to half the width and height of the smallest coding unit (SCU) size, generally resulting in 4×4 minimum block size. A block location can be specified as a block vector. A block vector can use 'motion vector delta' coding to code the X and Y co-ordinates of the block within the dictionary block memory 352. In such cases, the block location can be specified down to a unit-pel precision. In such cases, a block is selected from the dictionary block memory 352 by copying an array of samples without the use any interpolation filters. For the chroma channels, the X and Y components of the vector are rounded as required to retain unit-pel precision for the 4:2:0 and 4:2:2 chroma formats.

Alternatively, the location of the block in the dictionary block memory 352 may be specified using a 'block index'. A block index provides an index into the dictionary block memory 352 with a granularity of the smallest supported block size within the dictionary. For example, with a 64×64 coding tree unit (CTU) size and minimum 4×4 prediction unit (PU) size, the index uniquely identifies one of 256 4×4 blocks. The index can be interpreted as having X and Y components, each having a range from 0 to 15 (i.e. 4 bits per component), resulting in an 8-bit block index. In one arrangement, the X and Y components are separately encoded, e.g. by reusing the motion vector delta syntax structure or by using fixed-length code words of bypass-coded bins. Alternatives to the X and Y Cartesian addressing scheme are also possible. For example, a 'Z-scan' order index may be used. The Z-scan order index specifies the Z-scan order within the coding tree unit (CTU) and the granularity of the minimum block size. The Z-scan order is further described with reference to FIGS. 6A and 6B.

In another arrangement, the precision of the block index is adjusted according to the size of the current prediction unit (PU). In such arrangements, the storage of the block of reconstructed samples in the dictionary block memory 352 is aligned to the size of the block of reconstructed samples. For example, for a dictionary block memory 352 with capacity for one 64×64 coding tree unit (CTU) of samples and a 32×32 block of reconstructed samples, the reconstructed samples are stored in one of four possible locations, corresponding to a 2×2 array. As such the X and Y components of the block index are each 1-bit in size, resulting in a 2-bit block index. For another example, for a dictionary block memory 352 with capacity for one 64×64 coding tree unit (CTU) of samples and a 8×8 block of reconstructed samples, the reconstructed samples are stored in one of sixty-four possible locations, corresponding to an 8×8 array. As such the X and Y components of the block index are each 3-bit in size, resulting in a 6-bit block index. For yet another example, for a dictionary block memory 352 with capacity for one 64×64 coding tree unit (CTU) of samples and a 64×64 block of reconstructed samples, the reconstructed samples are stored in one possible locations, corresponding to a 64×64 array. As such the X and Y components of the block index are each not present in the encoded bitstream 312, as there is no need to specify the block location in the dictionary block memory in this example.

The reconstructed samples 370 are also input to a de-blocking filter module 330. The de-blocking filter module 330 performs filtering along block boundaries, including coding unit (CU) boundaries, prediction unit (PU) boundaries and transform unit (TU) boundaries, down to a granularity of boundaries along an 8×8 sample grid in each colour channel. The de-blocking filter module 330 produces de-blocked samples 372 that are written to the frame buffer module 332 configured within the memory 206. The frame buffer module 332 is a buffer with sufficient capacity to hold data from one or more past frames for future reference as part of a reference picture list, e.g. for inter-prediction.

The entropy encoder 324 encodes the transform coefficients 364, the prediction mode (i.e. the intra-prediction mode 380 and the dictionary load flag 390), the dictionary block load address 386, the dictionary block store address 392, the dictionary store flag 388, the motion vectors (or motion vector differences) and other parameters, collectively referred to as 'syntax elements', into the encoded bitstream 312 by performing a context adaptive binary arithmetic coding (CABAC) algorithm. In particular, the entropy encoder 324 encodes the dictionary storage flag 388 to indicate either that an associated prediction unit (PU) is stored into the dictionary block memory 352, or that the associated prediction unit (PU) is not stored into the dictionary block memory 352. As part of encoding the prediction mode, the entropy encoder 324 also encodes the dictionary load flag 390 to indicate that a prediction unit (PU) should be produced by reading a block from the dictionary block memory 352. The dictionary load flag 390 signals a prediction mode that thus is either encoded into a 'pred_mode' syntax element or encoded using a separate flag, but this flag is still considered as defining the prediction mode of the coding unit (CU). Syntax elements are grouped together into 'syntax structures'. In addition to ordinal values, such as an intra-prediction mode or integer values, such as a motion vector, syntax elements also include flags, such as to indicate a quad-tree split.

Although the video decoder 134 of FIG. 4 is described with reference to a high efficiency video coding (HEVC) video decoding pipeline, other video codecs may also employ the processing stages of modules 420-440. The encoded video information may also be read from memory 206, the hard disk drive 210, a CD-ROM, a Blu-ray Disk™ or other computer readable storage medium. Alternatively the encoded video information may be received from an external source, such as a server connected to the communications network 220 or a radio-frequency receiver.

As seen in FIG. 4, received video data, such as the encoded bitstream 312 (the 'video bitstream'), is input to the video decoder 134. The encoded bitstream 312 may be read from memory 206, the hard disk drive 210, a CD-ROM, a Blu-ray Disk™ or other computer readable storage medium. Alternatively the encoded bitstream 312 may be received from an external source such as a server connected to the communications network 220 or a radio-frequency receiver. The encoded bitstream 312 contains encoded syntax elements representing the captured frame data to be decoded.

The encoded bitstream 312 is input to an entropy decoder module 420 which extracts the syntax elements from the encoded bitstream 312 and passes the values of the syntax elements to other blocks in the video decoder 134. The entropy decoder module 420 applies the context adaptive binary arithmetic coding (CABAC) algorithm to decode syntax elements from the encoded bitstream 312. The decoded syntax elements are used to reconstruct parameters within the video decoder 134. Parameters include zero or more residual data array 450, motion vectors 452 (motion vector differences are decoded from the encoded bitstream 312 and from these, the motion vectors 452 are derived), a prediction mode 454, a dictionary block store address 474 and a dictionary block load address 468, all derived from the entropy decoder 420. The residual coefficient array 450 is passed to a dequantiser module 421, the motion vectors 452 are passed to a motion compensation module 434, and the prediction mode 454 is passed to an intra-frame prediction module 426 and to a multiplexer 428.

The dequantiser module 421 performs inverse scaling on the residual coefficients of the residual coefficient array 450 to create transform coefficients 455. The dequantiser module 421 outputs the transform coefficients 455 to an inverse transform module 422. The inverse transform module 422 applies an 'inverse transform' to convert the transform coefficients 455 from a frequency domain representation to a spatial domain representation, outputting a residual sample array 456. The inverse transform module 422 performs the same operation as the inverse transform module 328 of the video encoder 114.

A summation module 424 produces reconstructed samples 458 by adding the residual sample array 456 to a block of predicted samples (i.e. the prediction unit (PU) 466). The prediction unit (PU) 466 is produced by one of the available prediction methods, as selected by a multiplexor module 428 according to the prediction mode 454. As such the entropy decoder 420, dequantiser module 421, the inverse transform module 422 and summation module 424 collectively form reconstruction apparatus by which the reconstructed samples 458 are decoded from the bitstream 312.

For inter-prediction, the motion compensation module 434 uses the motion vectors 452 from the entropy decoder module 420, combined with reference frame data 460 from a frame buffer block 432, configured within the memory 206, to produce an inter-predicted prediction unit (PU) 462 for a prediction unit (PU). The inter-predicted prediction unit (PU) 462 is a prediction of output decoded frame data based upon previously decoded frame data.

For intra-prediction, the intra-frame prediction module 426 produces an intra-predicted prediction unit (PU) 464 for the prediction unit (PU). The intra-prediction prediction unit (PU) 464 is produced using data samples spatially neighbouring the prediction unit (PU) and a prediction direction also supplied by the prediction mode 454. The spatially neighbouring data samples are obtained from reconstructed samples 458, output from a summation module 424.

For intra block copy mode, an intra-block copy module 436 produces a block of reference samples 438, by copying an array of samples from the current and/or the previous coding tree blocks (CTBs). The offset of the reference samples is calculated by adding a block vector (decoded by the entropy decoder 420) to the location of the current coding block (CB) within the current coding tree block (CTB). The multiplexer module 428 selects the intra-predicted prediction unit (PU) 464 or the inter-predicted prediction unit (PU) 462 for a prediction unit (PU) 466 or a reference block 438 from the intra block copy module 436, depending on the current prediction mode 454.

For dictionary block copy mode, a dictionary block copy module 437 receives the dictionary load flag 472 and the dictionary store flag 470 decoded from the entropy decoder 420. The dictionary load flag 472 indicates a type of prediction mode and thus is either encoded as part of the prediction mode ('pred_mode') syntax element or using a separate flag in the encoded bitstream 312 (as described in FIG. 12). As each prediction unit (PU) may only use one prediction mode, the available prediction modes are mutually exclusive in the video decoder 134. As a consequence, the memory bandwidth to perform a dictionary load operation is the same as the memory bandwidth to perform an intra-block copy operation on a block of the same size. Thus, the availability of dictionary load as a prediction mode imposes no additional worst-case memory bandwidth requirement on the video decoder 134.

The dictionary store operation is applicable to prediction units (PUs) produced, regardless of the type of prediction mode that was used to produce the prediction unit (PU). Thus, signalling the dictionary store flag 470 is possible for all prediction modes. For 'skipped' coding units (CUs), no motion vector delta is present in the encoded bitstream and no residual information is present in the bitstream. Thus, for skipped coding units (CUs), the block of samples to be used for the prediction unit (PU) is present in the frame buffer (e.g. 332, 432). As this block is already available, copying this block into the dictionary block memory buffer would be a redundant operation. Thus, for skipped coding units (CUs), signalling the dictionary store flag (i.e. 922 as described in FIG. 9) in the encoded bitstream 312 is not required and may be omitted to preserve the efficient syntax of skipped coding units (CUs).

The dictionary store flag 470 signals that the reconstructed samples are stored into a dictionary block memory buffer 440. With the video encoder 114, a location to store the reconstructed samples in the dictionary block memory buffer 440 is either decoded from the encoded bitstream, as illustrated using the dictionary block address 468, or may be determined using an algorithm. The dictionary block address 468 can be derived from either a block vector or a block index, as described with reference to the video encoder 114. A block stored in the dictionary block memory 440 is then available to be read to provide samples for a later prediction unit (PU). For each of the prediction modes in the video decoder 134, the same output is produced for the corresponding prediction mode in the video encoder 114. Specifically, the intra-frame prediction module 426 produces identical output to the intra-frame prediction module 336, the intra block copy module 436 produces identical output to the intra block copy module 350, the dictionary block copy module 437 produces identical output to the dictionary block copy module 351 and the motion compensation module 434 produces identical output to the motion compensation module 334. This property of the video encoder 114 to generate prediction units (PUs) having the same contents as those available in the video decoder 134 allows optimal measurement and coding of the residual sample array 360.

The reconstructed samples 458 are then input to each of a de-blocking filter module 430, the intra-frame prediction module 426 and the intra block copy module 436. The de-blocking filter module 430 performs filtering along data block boundaries, such as transform unit (TU) boundaries, to smooth visible artifacts. The output of the de-blocking filter module 430 is written to the frame buffer module 432 configured within the memory 206. The frame buffer module 432 provides sufficient storage to hold one or more decoded frames for future reference. Decoded frames 412 are also output from the frame buffer module 432 to a display device, such as the display device 136 (e.g., in the form of the display device 214).

FIG. 5A is a schematic block diagram showing an exemplary coding tree unit (CTU) 500. Generally the coding tree unit (CTU) 500 size (or 'largest coding unit' size) is 64×64, although sizes such as 16×16 and 32×32 are also possible. A quad-tree split divides a coding tree unit (CTU) into four square regions. These regions may themselves be further split into four smaller square regions. This collection of split operations is referred to as a 'quad-tree hierarchy'. A coding unit (CU) exists at each leaf node of the quad-tree hierarchy (i.e. where no further quad-tree splits occur). In FIG. 5A, after the first split, 32×32 coding units (CUs) 502, 504, 508 exist. A lower-left region 506 is further split, resulting in 16×16 coding units (CUs) 510, 512, 514, 516. A lower limit on the coding unit (CU) size also exists, known as the 'smallest coding unit size'. Generally the lower limit is 8×8 luma samples.

FIGS. 5B(1) to 5B(4) are schematic representations of PART_N×N, PART_2N×2N, PART_2N×N and PART_N× 2N partition modes, respectively. A coding unit (CU) 540 has a PART_N×N partition mode, indicating that the coding unit (CU) 540 includes four square prediction units (PUs). A coding unit (CU) 542 has a PART_2N×2N partition mode, indicating that the coding unit (CU) 542 includes one prediction unit (PU). A coding unit (CU) 544 has a PART_2N×N partition mode, indicating that the coding unit (CU) 544 includes two prediction units (PUs). A coding unit (CU) 546 has a PART_N×2N partition mode, indicating that the coding unit (CU) 546 includes two prediction units (PUs). The spatial arrangement of the prediction units (PUs) within the coding units (CUs) for each partition mode is shown in each of FIGS. 5B(1) to 5B(4). The PART_2N×2N partition mode is available for a coding unit (CU) regardless of size. Then, the PART_2N×N, PART_N×2N and PART_N×N partition modes are generally only available for a coding unit of the smallest coding unit size.

If the smallest coding unit (SCU) size is configured as 8×8, the sizes of the PART_2N×N, PART_N×2N and PART_N×N partitions are 8×4, 4×8 and 4×4 luma samples, respectively. In high efficiency video coding (HEVC) a design principle exists that the minimum block size is 4×4 samples, and that larger blocks are always a multiple of 4 samples in each side dimension. Then, in the above example, for the 4:2:0 chroma formats, the chroma block sizes would be 4×2, 2×4 and 2×2 chroma samples respectively. Instead of violating the 4×4 minimum block size principle, the chroma block size is kept at 4×4 in these cases, resulting in one chroma block being collocated with multiple luma blocks. Then, the block location for one of the luma blocks is applied to the chroma block. In one arrangement, the uppermost and leftmost of the luma blocks is used to provide the block location for the chroma block. In another arrangement, the lowermost and rightmost of the luma blocks is used to provide the block location for the chroma block.

Figures 6A, 6B:
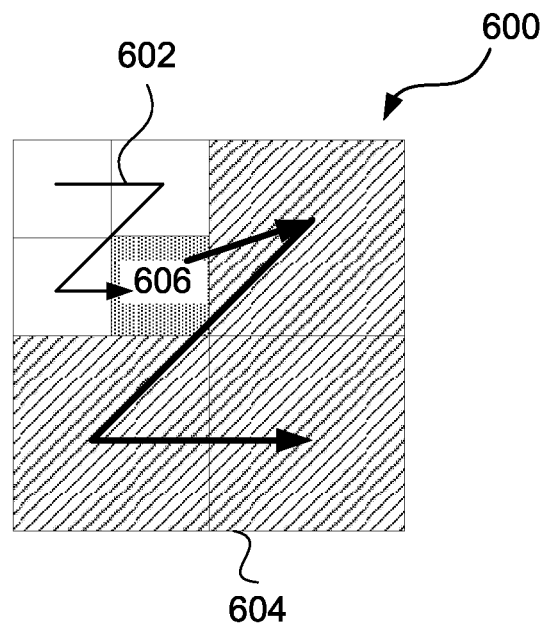
FIG. 6A is a schematic representation of an example 'Z-scan' order of scanning coding units (CUs) within a coding tree block (CTB)
FIG. 6B is a schematic representation of the block indices of 8×8 blocks in a 64×64 coding tree unit (CTU), ordered according to a Z-scan.

FIG. 6A is a schematic block diagram showing an example 'Z-scan' order of scanning coding blocks (CBs) within a coding tree block (CTB) 600. At each level of the hierarchical decomposition of the coding tree block (CTB) 600, a scan resembling a 'Z' is performed, i.e. from left to right, and then from top to bottom. This is applied recursively in a depth-first manner. In the example of FIG. 6A, the four coding blocks (CBs) in the top-left of the coding tree block (CTB) 600 are scanned as in a Z-scan order 602, reaching a coding block (CB) 606 that is currently being processed in the example of FIG. 6A. The remainder of the coding tree block (CTB) 600 will be scanned according to Z-scan order 604. The samples from previously decoded coding blocks (CBs) in the coding tree block (CTB) 600 are available for intra-prediction. The reconstructed samples from the coding blocks (CBs) that have not yet been reconstructed by the video decoder 134 are not available for intra-prediction. These samples are illustrated with diagonal hatching in FIG. 6A. As such, the video encoder 114 also treats these samples as not being available for intra-prediction.

FIG. 6B further shows the Z-scan order by showing the block index for each 8×8 block within a 64×64 coding tree block (CTB) 610.

Figure 6C:
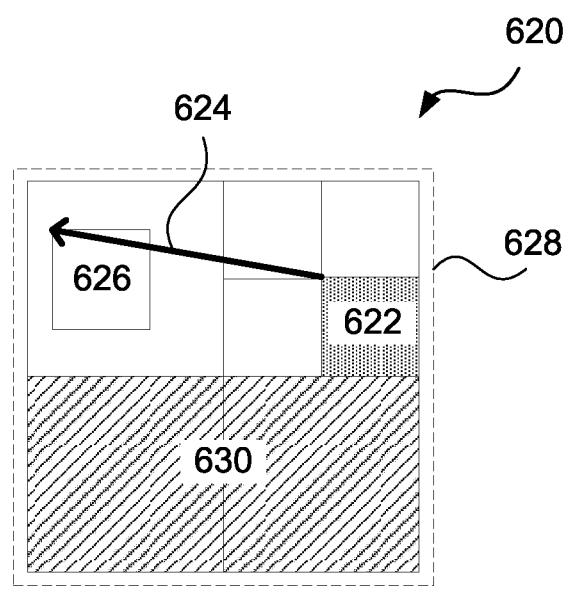
FIG. 6C is a schematic representation of an example coding unit (CU) predicted by a block of samples within a neighbouring coding tree block (CTB)

FIG. 6C is a schematic block diagram showing an example intra block copy operation. A coding block (CB) 622 is configured to use intra block copy mode. A block vector 624 references a reference block 626 of samples relative to the top-left sample position of the coding block (CB) 622 in a current coded tree block (CTB) 628 used to reconstruct a coding block (CB) 622. A region 630 of the current coded tree block (CTB) 628 has not yet been decoded because these regions are subsequent to the coding block (CB) 622 in the Z-scan order. The region 630 is thus not available for referencing. In the example of FIG. 6B, the reference block 626 is contained entirely within the current coding tree block (CTB) 628 and the previous coding tree block (CTB) is not shown. The memory capacity of the intra block copy module 350 in the video encoder 114 and the intra block copy module 436 in the video decoder 134 is sufficient to hold the luma and chroma samples of two coding tree blocks (CTBs), with the coding tree block (CTB) size configured as 64×64 luma samples and corresponding dimensions for chroma in accordance with the selected chroma format.

FIG. 7A(1) shows a frame 700 with an intra-block copy operation. The example of FIG. 7A is applicable to both the video encoder 114 and the video decoder 134. A region 702 (unshaded) represents reconstructed samples, and a region 704 (shaded) represents samples that have not been reconstructed. A coding unit (CU) 706 contains an alphanumeric character ('m'). In this example, the PART_2N×2N partition mode is used (see FIG. 5B(3)), so the coding unit (CU) is collocated with one prediction unit (PU). When using the intra-block copy operation, the best reference block found in the block vector search is the reference block 710, which is used to create a prediction unit (PU) having the same contents. A block vector 708 provides reference to the reference block 710 from the coding unit (CU) 706. As the reference block 710 contains a different alphanumeric character ('n'), the residual sample array 714 contains those sample values required to reconstruct the correct block (i.e. the letter 'm'), as seen in FIG. 7A(2). The residual sample array 714 contains an irregular shape and is thus poorly suited to intra-prediction. The residual sample array 714 also has sharp edges (i.e. sample values are one of a few values, with no smooth transition), so the residual transform is generally not efficient and representing such a residual sample array in the frequency domain. In such cases, a transform skip mode of operation is likely to be selected by the video encoder 114. In the example of FIG. 7A, an earlier coding unit (CU) 712 contained sample values much closer to the sample values of the coding unit (CU) 706. As the earlier coding unit (CU) 712 is outside the area of reference permitted by the intra-block copy operation, the coding unit (CU) 712 could not be selected for use to predict the coding unit (CU) 706.

FIG. 7B(1) shows the frame 700 with a dictionary block copy operation. In the example of FIG. 7B(1), a dictionary store operation (i.e. 748) is applied to a first coding unit (CU) 712. Application of the dictionary store operation results in storing the reconstructed samples of the coding unit (CU) 712 into a dictionary block memory 750 (i.e. 352 in the video encoder 114 or 440 in the video decoder 134) as a block 752. When a second coding unit (CU) 756 is being predicted, a dictionary load operation (i.e. 754) is applied, copying the block 752, for the first coding unit 712, from the dictionary block memory 750 into the prediction unit (PU). As the block 752 is a close match (e.g. the sum of absolute differences for the block 752 and the block 756 is lowest among the tested blocks) to the required contents of the block 756, the residual sample array (i.e. 758) contains negligible or no non-zero sample values, as seen in FIG. 7B(2). As such, highly efficient compression is achieved by using the dictionary block copy operation.

FIGS. 8A-8D show example configurations for storage 800 of the dictionary block memory buffer 352, 440 and the reconstructed samples, e.g. in the memory 206. In these examples, the storage 800 is configured as a two-dimensional array of various dimensions, suitable for storing blocks of supported sizes (e.g. 4×4, 8×8, 16×16, 32×32 and possibly 64×64). The bandwidth for accessing this memory is very high, as each prediction unit (PU) requires read and write operations to this memory, and so hardware implementations generally use on-chip memory for this storage. As on-chip memory is costly in terms of silicon area, the amount of memory used is generally kept relatively low.

Figure 8A:
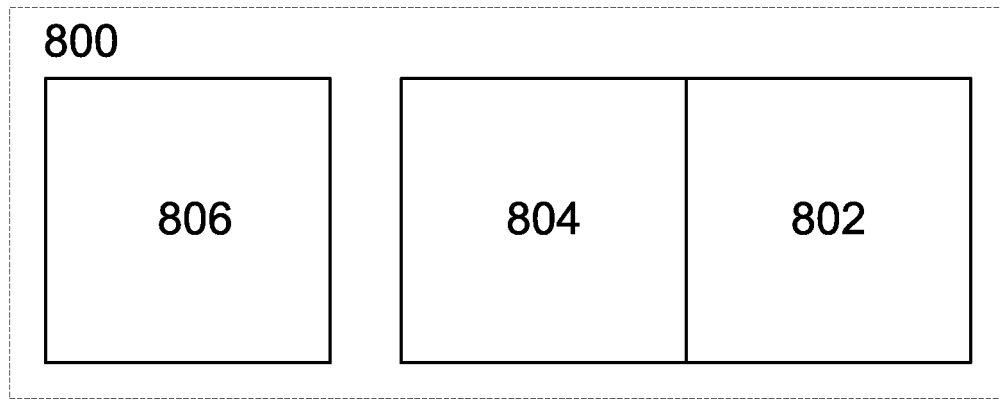
FIGS. 8A, 8B, 8C, 8D are schematic representations of an example reconstructed samples memory buffer for intra block copy and for dictionary block copy.

In the example of FIG. 8A, the storage 800 includes one coding tree unit (CTU) of storage for the reconstructed samples of the current coding tree unit (CTU) 802 and further storage 804 having a width of 64 samples and a height equal to the height of a coding tree unit (CTU). With a coding tree unit (CTU) size of 64×64, the storage 804 is sufficient for one coding tree unit (CTU) of reconstructed samples left of the current coding tree block (CTU) 802. Collectively, the stores 802 and 804 provide the required storage for intra-prediction and intra-block copy. A coding tree unit (CTU) 806 provides storage for the dictionary block memory. With a coding tree unit (CTU) size of 64×64 and a 4:4:4 chroma format, the required storage is thus 3*3*64*64 or 36,864 samples.

Figure 8B:
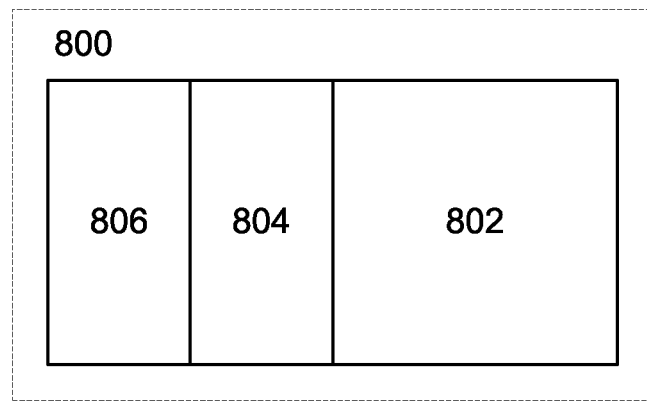

In the example of FIG. 8B, the storage 800 is reduced. The storage for the left coding tree unit (CTU) 802 is reduced such that the width is 32 samples instead of 64 samples, and is thus half of one 64×64 coding tree unit (CTU), i.e. to ½*3 (colour channels)*64*64 or 6,144 samples. Also, the storage for the dictionary block memory is reduced to half of one coding tree unit (CTU). Thus, the overall storage is equal to 2*3*64*64 samples or 24,576 samples. In the example of FIG. 8B, the required storage is the same as for a system 100 with intra block copy implemented but dictionary block copy not implemented. Also, in the example of FIG. 8B it is not possible to load or store a 64×64 prediction unit (PU) in the dictionary block memory buffer 352 440. As such, the signalling supported in the coding unit (CU) syntax structure 906 for dictionary block copy mode can be restricted to prohibit selecting dictionary load as a prediction mode and dictionary store operations for 64×64 blocks. Arrangements of the system 100 conforming to the example of FIG. 8B thus have no additional memory requirement to support dictionary block copy. Experiments show that the penalty for halving the storage 804 from one coding tree unit (CTU) to half a coding tree unit (CTU) results in a reduction of the gain of intra-block copy by 2% under 'common test conditions' as defined by the joint collaborative team on video coding (JCT-VC).

Figure 8C:
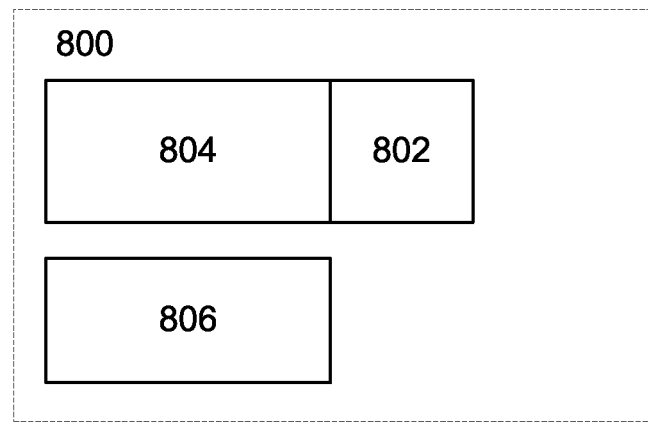

In the example of FIG. 8C, the storage 800 is further reduced due to the coding tree unit (CTU) size being configured as 32×32. In this example, the storage 804 has dimensions of 64×32, due to the width remaining constant at 64 and the height being reduced to correspond to the coding tree unit (CTU) height.

Figure 8D:
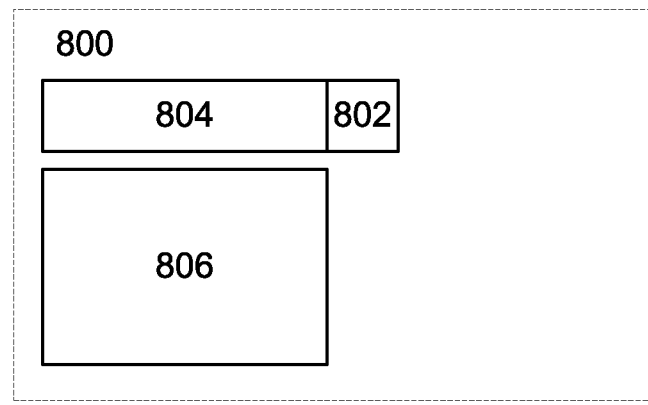

In the example of FIG. 8D, the storage 800 is further reduced due to the coding tree unit (CTU) size being configured as 16×16. In this example, the storage 804 has dimensions of 64×16, due to the width remaining constant at 64 and the height being reduced to correspond to the coding tree unit (CTU) height.

In the examples of FIGS. 8C and 8D the total storage 800 is not reduced compared to the example of FIG. 8A or 8B, as the coding tree unit (CTU) size can be any of 16×16, 32×32 or 64×64, so the worst case of 64×64 must be provisioned for. However, the storage 804 is reduced for the smaller coding tree unit (CTU) sizes, resulting in inaccessible space in the storage 800. The compression efficiency increase of intra-block copy is reduced for the examples of FIGS. 8C and 8D compared to the example of FIG. 8A due to the reduced size of the storage 804. As the storage 800 has a fixed capacity, it is possible to increase the size of the storage 806 in the examples of FIGS. 8C and 8D. Increasing the storage 806 allows larger compression efficiency increases to be achieved from dictionary block copy, compensating for the reduced compression efficiency increase achieved by intra-block copy.

In some arrangements, intra-block copy is omitted entirely from the system 100 and dictionary block copy used exclusively as the means of intra-frame block-based prediction. In such arrangements, the storage 804 is not required and the storage 802 is only required for intra-prediction and buffering reconstructed samples prior to de-blocking.

Figure 9:
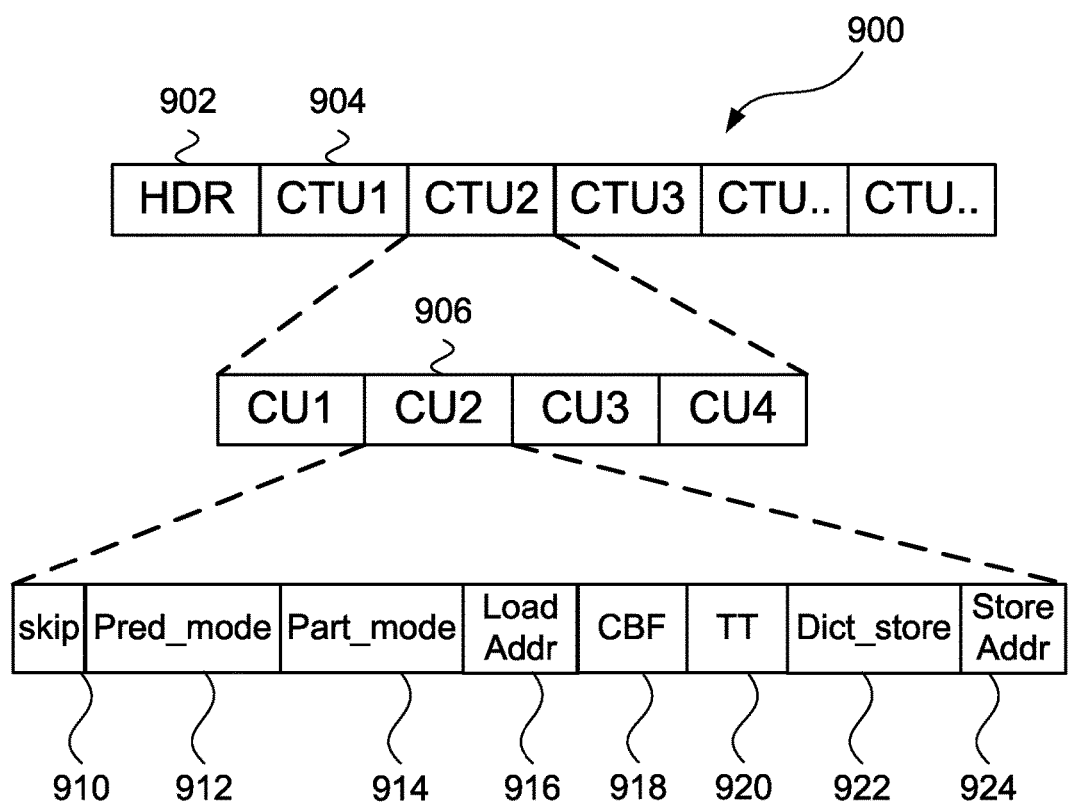
FIG. 9 is a schematic representation of a coding unit (CU) syntax structure for a coding unit (CU) where the reconstructed samples may be stored in a dictionary memory buffer and the prediction block may be loaded from a dictionary memory buffer.

FIG. 9 is a schematic block diagram showing a coding unit (CU) syntax structure 902 within a video coding layer network abstraction layer (NAL) unit within the encoded bitstream 312. A video coding layer network abstraction layer (NAL) unit includes a set of syntax elements and has a network abstraction layer (NAL) unit type. Video coding layer network abstraction layer (NAL) unit types such as 'I-slice' or P-slice' indicate that the video coding layer network work abstraction layer (NAL) unit contains a set of coding tree units (CTUs) grouped together into a slice. Such video coding layer network abstraction layer (NAL) units include a video coding layer network abstraction layer (NAL) unit header 902 followed by one or more coding tree units (CTUs), e.g. 904. As described with reference to FIG. 5A, each coding tree unit (CTU) is divided into one or more coding units (CUs), e.g. 906. A coding unit (CU) syntax structure describes the contents of one coding unit. A skip flag 910 ('cu_skip_flag') is present in the encoded bitstream 312 for coding units (CUs) in slices that support the use of inter-prediction, i.e. 'P-slices'. The skip flag 910 signals that the coding unit (CU) includes an inter-predicted prediction unit (PUs) and that no residual or motion vector difference is present in the encoded bitstream 312 for the prediction unit (PU) associated with this coding unit (CU). A prediction mode 912 indicates the prediction mode for the prediction units (PUs) in the coding unit (CU). The prediction is indicates one of intra-prediction, inter-prediction, intra-block copy or dictionary block copy. A partition mode 914 indicates which partition mode (i.e. PART_N×N, PART_2N×2N, PART_2N×N or PART_N×2N) is used for the prediction units (PUs) in the coding unit, and implicitly the number of prediction units (PUs) in the coding unit (CU). For prediction units (PUs) using dictionary block copy, a dictionary load location 916 is present in the encoded bitstream 312. The dictionary load location 916, which is typically an address, specifies which block in the dictionary block memory is used to provide samples for the prediction unit (PU) of the coding unit (CU). A root coded block flag 918 (or 'rqt_root_cbf') signals the presence of residual data within the coding unit (CU). If the flag 918 has a value of zero, no residual data is present in the coding unit (CU). If the flag 918 has a value of one, there is at least one significant residual coefficient in the coding unit (CU) and hence a residual quad-tree (RQT) exists in the coding unit (CU). In such cases, a transform tree 920 syntax structure encodes the uppermost hierarchical level of the residual quad-tree (RQT) in the encoded bitstream 312. Additional instances of transform tree syntax structures and transform unit syntax structures are present in the transform tree 920 syntax structure, in accordance with the residual quad-tree hierarchy of the coding unit (CU).

If a coding unit (CU) is to use skip mode, this is indicative that a good reference block is available in the frame buffer module (i.e. 332, 432). As such, there is no need to be able to also store this block into the dictionary block memory and so a dictionary store flag 922 ('dict_store') is not available (i.e. included in the encoded bitstream 312) for skipped coding units (CUs). The unavailability of the dictionary store flag 922 for skipped coding units (CUs) also reduces the signalling overhead. If the coding unit is not skipped, then the dictionary store flag 922 signals if the current prediction unit (PU) should be stored in the dictionary block memory. If the current prediction unit is to be stored, a dictionary store address 924 indicates the location in the dictionary block memory to store the block. A dictionary store flag 922 and a dictionary store address 924 are present in the encoded bitstream 312 for each prediction unit (PU) in the coding unit (CU). The size of each block is equal to the size of the corresponding prediction unit (PU). Arrangements only supporting PART_2N×2N partition mode for the dictionary block copy do not require a partition mode 914 in the encoded bitstream 312, as the partition mode is implied by the prediction mode in this case.

Figure 10A:
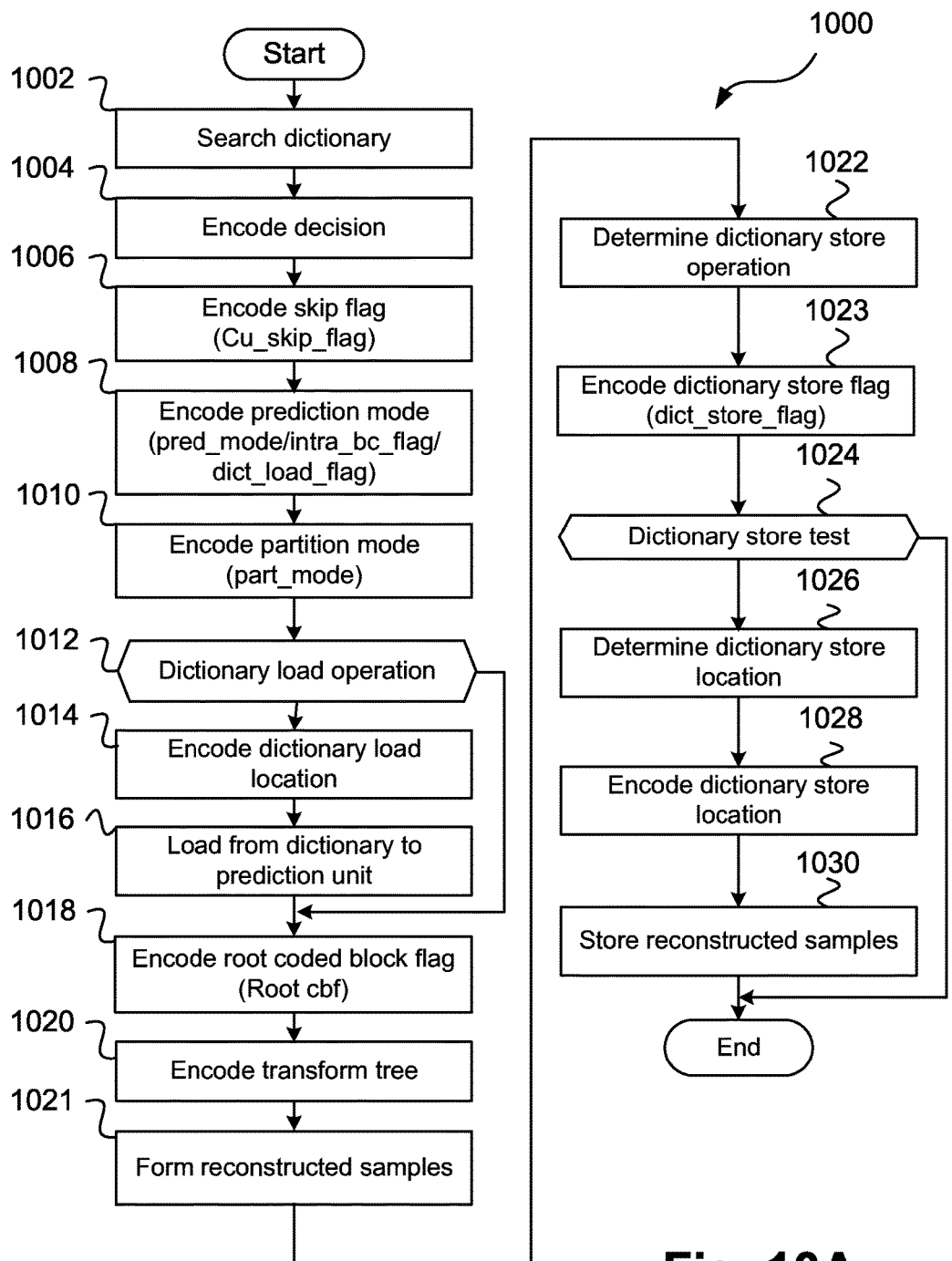
FIG. 10A is a schematic flow diagram showing a method for encoding a coding unit (CU) with support for loading and storing blocks to a dictionary memory.

The presence of syntax elements related to dictionary block copy (syntax elements 916, 924 and extension to the syntax element 912) in the encoded bitstream 312 may be controlled via 'high level syntax', enabling the signalling overhead of the dictionary block copy mode to be removed in cases where the mode is not applied. For example, a 'constraint' flag may be used to prohibit the use of dictionary block copy mode for a specific profile of high efficiency video coding (HEVC). Such a constraint flag is present in a network abstraction layer (NAL) unit known as a 'sequence parameter set' and is an example of high level syntax. FIG. 10A is a schematic flow diagram showing a method 1000 for encoding a coding unit (CU) syntax structure 902 for a coding unit (CU) supporting use of the dictionary block copy mode (i.e. dictionary store operations and dictionary load operations) into the encoded bitstream 312. The method 1000 results in encoding the coding unit (CU) syntax structure 906 of FIG. 9 into the encoded bitstream 312. The method 1000 is firstly performed for a coding unit (CU) where the reconstructed samples are to be stored into the dictionary block memory 352. The method 1000 is then performed for a coding unit where the prediction unit(s) (PUs) are to be obtained from the dictionary block memory 352. For a coding unit (CU) with a prediction mode indicating that dictionary block copy is in use for all prediction units (PUs) within the coding unit (CU), the PART_N×N, PART_2N×N and PART_N×2N partition modes are only available when the coding unit (CU) size is equal to the smallest coding unit (SCU) size (typically 8×8). This results in the possibility to perform dictionary block copy operations on blocks down to a size of 4×4. The method 1000 is performed in the video encoder 114, under the execution of the processor 205.

At a search dictionary step 1002, the dictionary block copy module 351 in the video encoder 114 tests a set of available blocks present in the dictionary block memory buffer 352 against the corresponding block of input frame data 310. In one approach, the test involves computing a 'sum of absolute differences' between the block in the input frame data 310 and the blocks in the dictionary block memory buffer 352. The block providing a minimised sum of absolute difference value is the optimal block in the dictionary. The time taken to perform the search depends on the number of blocks to be tested in the dictionary block memory buffer 352. As the size of this memory is limited, searching many blocks is generally quick, particularly when compared to testing blocks for inter-prediction, where external memory access is often required to fetch blocks for testing. The tested blocks are at various locations in the dictionary block memory buffer 351 and therefore each tested block has a unique dictionary load location 386. The dictionary load location 386 is represented in the bitstream using syntax elements (i.e. the dictionary load address 916). The cost of encoding the dictionary load address 916 for a particular block is expressed in bits. A cost parameter provides a weighted average of the encoding cost and the sum of absolute differences, and is comparable to cost parameters for other tested modes. In another approach, a hash is computed for the block of frame data 310 and hashes are also stored in the dictionary block memory buffer 352 by applying a hash function. The hash is a datum of a smaller size than the block on which the hash was computed. One example of a hash function is CRC32. In this approach, searching the dictionary buffer memory 352 involves calculating hash of the block and comparing the hash of the block of frame data 310 with the (precomputed) hashes of blocks in the dictionary buffer memory 352 and selecting a block where a matching hash is found. Classical hash functions like the CRC32 mentioned above can be used for an "equal to" comparison. However the classical hash functions produce hash values do not inherit degrees of similarity of the values being hashed. For example blocks that differ in only one pixel value will likely produce hash values very distant (i.e. different numerical value) from each other. Therefore the classical hash functions are not suitable for "similar to" comparisons. As such, instead of hashing with classical hash functions, the block can be downsampled or otherwise mapped to a smaller block of size comparable to a size of a hash value (e.g. four bytes for a CRC32). Such downsampled version of the block can be used instead of block hash to search the dictionary for both "equal to" and "similar to" comparisons with performance comparable to the performance of hash-based dictionary search. Comparing one hash against a list of hash values is faster than computing the sum of absolute differences against a list of blocks because the size of each hash is smaller than the size of each block.

If no block is available in the dictionary block memory 352, then the dictionary block mode is not selected by the video encoder 114 as a candidate mode for the prediction unit (PU) 382. Otherwise, the block having the closest match to the input frame data 310 is selected as a candidate block for the prediction unit (PU) 382. Separately, the video encoder 114 also tests other prediction modes, such as inter-prediction, to produce alternative candidates for the prediction unit (PU) 382. As a result of these tests, one prediction mode is selected for the coding unit (CU).

At an encode decision step 1004, the processor 205 selects one of the tested modes as the mode to use for the prediction unit (PU). The selected mode is generally the mode with an optimal cost parameter. The cost parameter is the result of adding the distortion and result of a lambda constant multiplied by the rate. As such, the lambda constant provides a means to alter the relative weighting of distortion compared to rate in the encode decision step 1004.

At an encode skip flag step 1006, the entropy encoder 324, under control of the processor 205, encodes the skip flag 910 into the encoded bitstream 312. The skip flag 910 signals that the coding unit (CU) is skipped, meaning that the selected prediction mode for the coding unit is inter-prediction and that the motion vectors for these prediction units (PUs) are derived from the motion vectors of neighbouring prediction units (PUs). Additionally, the skipped coding units (CUs) include no residual data. If a coding unit (CU) is skipped, then the method 1000 terminates, as no further data is required to be encoded into the encoded bitstream 312 for the coding unit (CU) (not illustrated).

Figure 12:
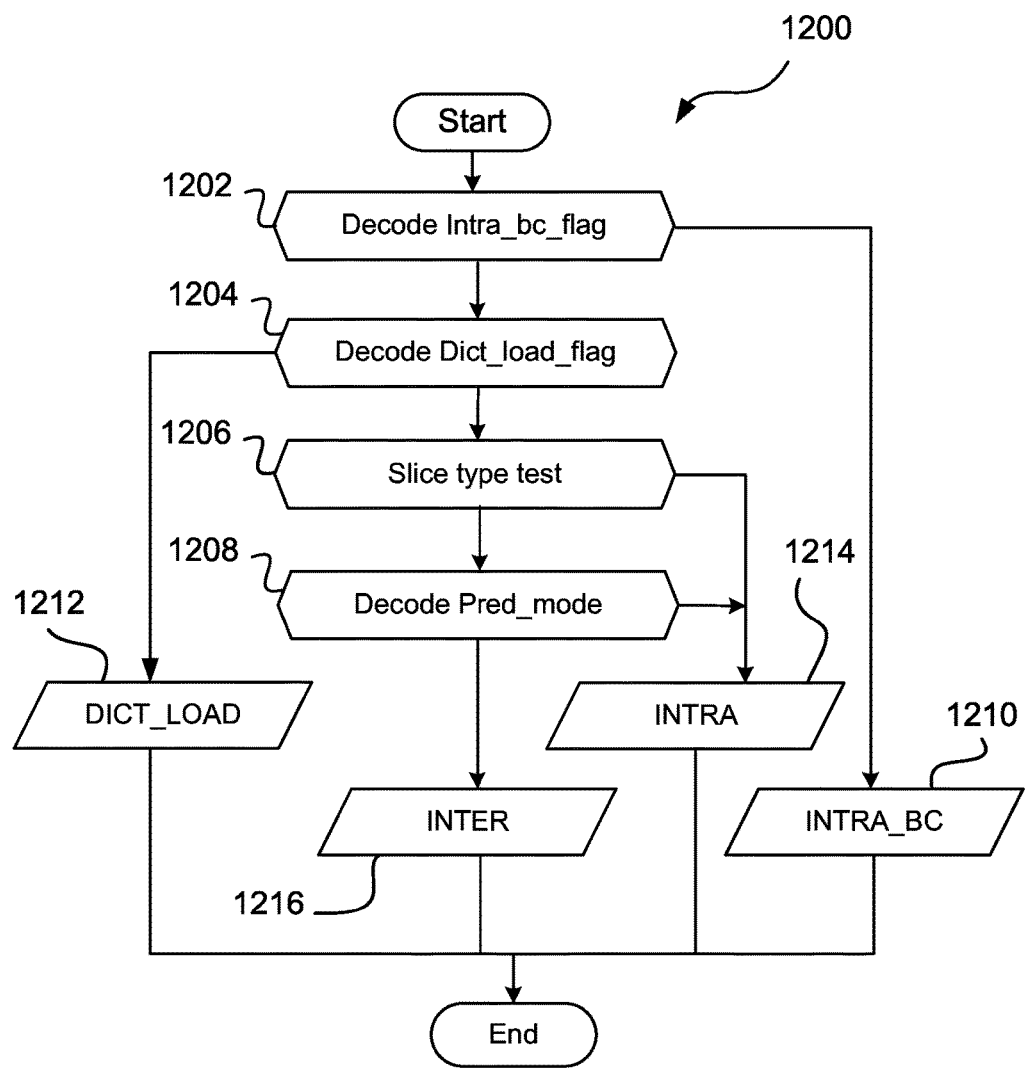
FIG. 12 is a schematic flow diagram showing a method for decoding a prediction mode that includes a dictionary prediction mode as one of the available modes of prediction.

At an encode prediction mode step 1008, the entropy encoder 324, under control of the processor 205, encodes the prediction mode (e.g. the dictionary load flag 390 indicates if the prediction mode is dictionary block copy mode, refer to FIG. 12) into the encoded bitstream 312 as the prediction mode 912. The prediction mode is a single syntax element specifying the prediction mode or is one or more flags which collectively identify the prediction mode. For example, 'intra_bc_flag' signals the use of intra block copy and 'pred_mode' signals the use of intra-prediction, inter-prediction mode and 'dict_load' signals the dictionary block copy.

At an encode partition mode step 1010, the entropy encoder 324, under control of the processor 205, encodes the partition mode 914 into the encoded bitstream 312. The partition mode 914 is only encoded for coding units where multiple partition modes are possible.

At a dictionary load operation test step 1012, the processor 205 determines if the prediction mode for the prediction unit (PU) is dictionary block mode. If so, control in the processor 205 passes to a determine dictionary load location step 1014, otherwise control in the processor 205 passes to an encode root coded block flag step 1018.

At the encode dictionary load location step 1014, the entropy encoder 324, under control of the processor 205, encodes the dictionary load location 386 into the encoded bitstream 312 as the dictionary load location 916. The dictionary load location 916 can be a block vector (e.g. encoded using a motion vector delta syntax structure) specifying the address of the block in the dictionary block memory 352. The dictionary load location 916 can also be an index (e.g. a fixed length set of bypass coded bins), such as a Z-scan order index to indicate the block location. At the encode dictionary load location step 1014, one dictionary load location 916 is encoded into the encoded bitstream 312 for each prediction unit (PU) in the coding unit (CU), for example from the corresponding dictionary load location 386.

At a load from dictionary step 1016, a block of samples is copied from the dictionary block copy module 351 to the prediction unit (PU) 382. The dictionary load location 386 (address) obtained from the step 1014 is used as the load address for the dictionary block memory 352.

At the encode root coded block flag step 1018, the entropy encoder 324, under control of the processor 205, encodes the root coded block flag 918 into the encoded bitstream 312. The root coded block flag indicates if any residual information (i.e. non-zero residual coefficients) exists in the residual quad-tree associated with the coding unit (CU).

At an encode transform tree step 1020, the entropy encoder 324, under control of the processor 205, encodes the residual quad-tree (i.e. the transform tree 920) associated with the coding unit (CU) into the encoded bitstream 312, if the root coded block flag value indicates the presence of any non-zero residual coefficients. The residual quad-tree includes split flags to further decompose the coding unit (CU) into one or more transform units (TUs). For each transform unit, a separate coded block flag is encoded into the encoded bitstream 312. Then, the residual coefficients of each transform unit (TU) are encoded into the encoded bitstream 312.

At a form reconstructed samples step 1021, the summation module 342, under control of the processor 205, forms the reconstructed samples 370 for the current prediction unit (PU) by adding the predicted samples 382 (e.g. from the dictionary block copy module 351) and the residual samples 368.

At a determine store dictionary operation step 1022, the processor 205 determines if the reconstructed samples 370 for the current prediction unit (PU) should be stored in the dictionary block memory 352. The step 1022 is further described with reference to FIG. 13.

At an encode dictionary store flag step 1023, the entropy encoder 324, under control of the processor 205, encodes the dictionary store flag 388 into the encoded bitstream 312 as a dictionary store flag 922, generally using one context coded bin. The dictionary store flag 922 indicates the result of the decision at the determine store dictionary operation step 1022.

At a dictionary store test step 1024, the processor 205 determines if the reconstructed samples 370 for the current prediction unit (PU) are to be stored into the dictionary block memory 352 (i.e. the result of the step 1022). If so, the control passes to a determine dictionary store location step 1026, otherwise the method 1000 terminates.

At the determine dictionary store location step 1026, the processor 205 determines a location to store the block in the dictionary block memory 352 (i.e. the dictionary store location 392).

At an encode dictionary store location step 1028, the entropy encoder 324, under control of the processor 205, encodes the dictionary store address 392 into the encoded bitstream 312 as the dictionary store location 924. As with the dictionary load location 916, the dictionary store location 924 can be a block vector using the motion vector delta syntax, or can be an index, e.g. using a fixed-length codeword.

At the store reconstructed samples step 1030, the reconstructed samples 370 are copied to the dictionary block memory 352, under control of the processor 205. The method 1000 then terminates.

In a specific implementation of the video encoder 114, at the store reconstructed samples step 1030, instead of storing the reconstructed samples 370 into the dictionary block memory 352, the prediction unit (PU) 382 is stored into the dictionary block memory 352. Such allows a pre-existing block of samples (e.g. as produced by the intra-block copy module 350) to be directly stored into the dictionary block memory 352 without adding any residual information.

Figure 10B:
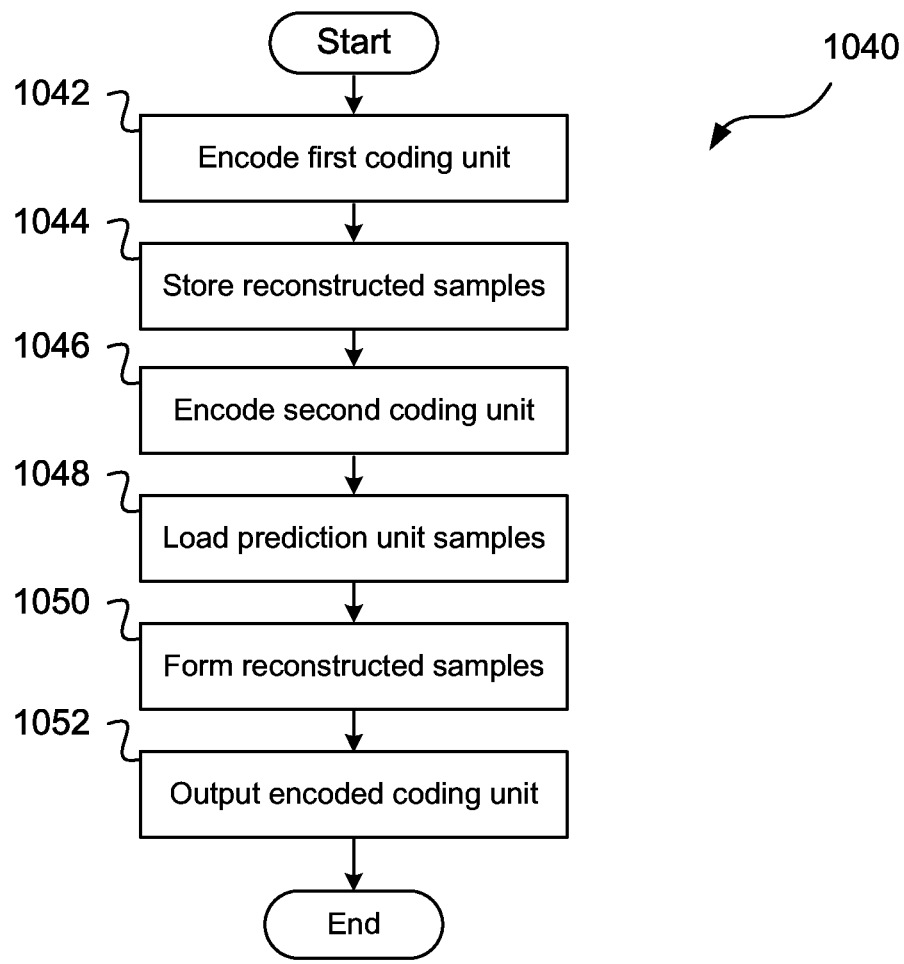
FIG. 10B is a schematic flow diagram showing a method for encoding a coding unit (CU) into an encoded bitstream using samples obtained from a dictionary memory that were earlier stored in the dictionary memory from an earlier encoded coding unit (CU)

FIG. 10B shows a method 1040 of encoding coding units (CUs) using dictionary block copy operation. The method 1040 involves encoding a first coding unit (CU) where the reconstructed samples of the prediction unit(s) (PUs) of the first coding unit (CU) are stored into the dictionary block memory 352. Then, the method 1040 involves encoding a second coding unit (CU) where the prediction units (PUs) for the second coding unit (CU) are produced by copying block(s) of samples from the dictionary block memory 352 to produce the prediction unit(s) (PUs) for the second coding unit (CU).

At an encode first coding unit step 1042 and a store reconstructed samples step 1044, the video encoder 114, under control of the processor 205, encodes a first coding unit (CU) into the encoded bitstream 312 by performing the method 1000 for the first coding unit (CU) and applying a dictionary store operation. As such, the decision at the step 1022 is to store the reconstructed samples of the first coding unit (CU) into the dictionary block memory 352 for subsequent use. The steps 1001-1012 and 1018-1021 are performed as part of the encode first coding unit step 1042. The step 1030 is performed as part of the step 1044.

At an encode second coding unit step 1046 and a load prediction unit samples step 1048, the video encoder 114, under control of the processor 205, encodes a second coding unit (CU) into the encoded bitstream 312 by performing the method 1000 for the second coding unit (CU) with the prediction mode set to dictionary block copy mode (i.e. dictionary load operation is performed). As such, the prediction units (PUs) for the second coding unit (CU) are obtained by copying one or more blocks of samples (e.g. as previously stored in the step 1044) from the dictionary block memory 352. The steps 1001-1014 and 1018-1020 are performed as part of the encode second coding unit step 1046 and the step 1016 is performed as part of the load prediction unit step 1048.

At a form reconstructed samples step 1050, the video encoder 114, under control of the processor 205, produces a block of reconstructed samples for the second coding unit (CU) by performing the step 1021 of the method 1000.

At an output encoded coding unit (CU) step 1052, the encoded bitstream 312 produced earlier (e.g. resulting from applying the method 1000 to encode the first and second coding units) is output from the video encoder 114. The method 1040 then terminates.

Figure 11A:
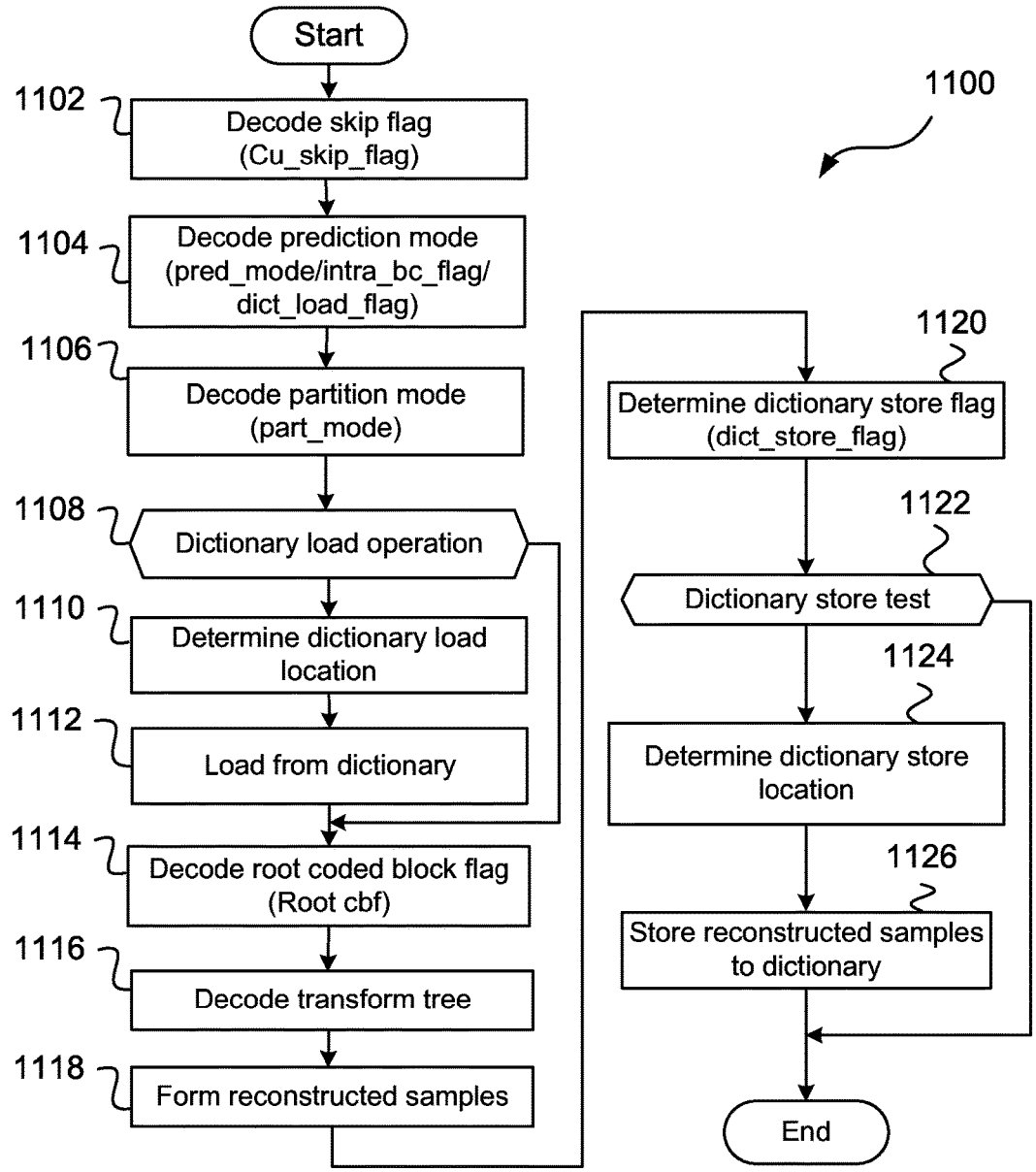
FIG. 11A is a schematic flow diagram showing a method for decoding a coding unit (CU) with support for loading and storing blocks to a dictionary memory.

FIG. 11A is a schematic flow diagram showing a method 1100 for decoding a coding unit (CU) syntax structure 902 for a coding unit (CU) supporting use of the dictionary block copy mode (i.e. dictionary store operations and dictionary load operations) from the encoded bitstream 312. The method 1100 results in decoding the coding unit (CU) syntax structure 906 of FIG. 9 from the encoded bitstream 312. The method 1100 is firstly performed for a (first) coding unit (CU) where the reconstructed samples are to be stored into the dictionary block memory 440. Setting of the dictionary store flag for the first coding unit (CU) indicates that reconstructed samples for a coding unit are available for decoding a second (i.e. subsequent) coding unit. The second coding unit can be spatially located far from the first coding unit in the video frame. The method 1100 is then performed for the second coding unit where the prediction unit(s) (PUs) are to be obtained from the dictionary block memory 440. For a coding unit (CU) with a prediction mode indicating that dictionary block copy is in use for all prediction units (PUs) within the coding unit (CU), the PART_N×N, PART_2N×N and PART_N×2N partition modes are only available when the coding unit (CU) size is equal to the smallest coding unit (SCU) size (typically 8×8). This results in the possibility to perform dictionary block copy operations on blocks down to a size of 4×4. The method 1100 is performed in the video decoder 134, under the execution of the processor 205.

At a decode skip flag step 1102 the entropy decoder 420, under control of the processor 205, decodes a skip flag from the encoded bitstream 312. The skip flag signals that the coding unit (CU) is skipped, meaning that the coding unit includes inter-predicted prediction units (PUs) and that the motion vectors for these prediction units (PUs) are derived from the motion vectors of neighbouring prediction units (PUs). Additionally, the skipped coding units (CUs) include no residual data. If a coding unit (CU) is skipped, then the method 1100 terminates, as no further data is required to be decoded from the encoded bitstream 312 for the coding unit (CU).

At a decode prediction mode step 1104, the entropy decoder 420, under control of the processor 205, decodes the prediction mode 912 from the encoded bitstream 312. The prediction mode is a single syntax element specifying the prediction mode, or is one or more flags which collectively identify the prediction mode. For example, 'intra_bc_flag' signals the use of intra block copy, 'pred_mode' signals the use of intra-prediction and inter-prediction, and 'dict_load' signals the dictionary block copy mode. This example is further described in FIG. 12. The prediction mode is associated with all of the prediction units (PUs) of the coding unit (CU).

At a decode partition mode step 1106, the entropy decoder 420, under control of the processor 205, decodes the partition mode 914 from the encoded bitstream 312. The partition mode 914 is only decoded for coding units where multiple partition modes are possible, otherwise the partition mode is inferred to be PART_2N×2N. The partition mode indicates the number and arrangement of prediction units (PUs) associated with (i.e. occupying) the coding unit (CU).

At a dictionary load operation test step 1108, the processor 205 determines if the prediction mode for the prediction unit (PU) is dictionary block copy mode. If so, control in the processor 205 passes to a determine dictionary load location step 1110, otherwise control in the processor 205 passes to a decode root coded block flag step 1114.

At the determine dictionary load location step 1110, the entropy decoder 420 determines the dictionary load location 468 by decoding the dictionary load location 916 from the encoded bitstream 312. The dictionary load location 916 is one or more syntax elements, such as a block vector, specifying the address of the block in the dictionary block memory 440. This is essentially equivalent and corresponds to the dictionary block location 386 (i.e. address) of FIG. 3 discussed above. The dictionary load location 916 can also be an index, such as a Z-scan order index to indicate the block location. One dictionary load location is decoded for each prediction unit (PU) in the coding unit (CU).

At a load from dictionary step 1112, a block of samples is copied from the dictionary block copy module 351 to the prediction unit (PU) 382. The dictionary load location 386 obtained from the step 1110 is used to provide the read address within the dictionary block memory buffer 440.

At the decode root coded block flag step 1114, the entropy decoder 420, under control of the processor 205, decodes the root coded block flag 918 from the encoded bitstream 312. The root coded block flag indicates if any residual information (i.e. non-zero residual coefficients) exists in the residual quad-tree associated with the coding unit (CU).

At a decode transform tree step 1116, the entropy decoder 420, under control of the processor 205, decodes the residual quad-tree (i.e. the transform tree 920) associated with the coding unit (CU) from the encoded bitstream 312, if the root coded block flag value indicates the presence of any non-zero residual coefficients. The residual quad-tree includes split flags to further decompose the coding unit (CU) into one or more transform units (TUs). For each transform unit, a separate coded block flag is decoded from the encoded bitstream 312. Then, the residual coefficients of each transform unit (TU) are decoded from the encoded bitstream 312.

At a form reconstructed samples step 1118, the summation module 424, under control of the processor 205, forms the reconstructed samples 458 for the current prediction unit (PU) by adding the predicted samples 466 (e.g. from the dictionary block copy module 437) and the residual samples 456.

At a determine dictionary store flag step 1120, the entropy decoder 420, under control of the processor 205, determines the dictionary store flag 470 by decoding the dictionary store flag 922 from the encoded bitstream 312. When the partition mode is PART_2N×2N, the dictionary store flag 470 is associated with the prediction unit (PU) of the coding unit (CU). For other partition modes, a separate dictionary store flag 470 is decoded and associated with each prediction unit (PU) of the coding unit (CU).

At a dictionary store test step 1122, the processor 205 determines if the reconstructed samples 458 for the current prediction unit (PU) are to be stored into the dictionary block memory 440 by testing the value of the dictionary store flag 470. If so, the control passes to a determine dictionary store location step 1124. If not, then the block of reconstructed samples 458 is not stored in the dictionary block memory 440 and the method 1100 terminates.

At a determine dictionary store location step 1124, the entropy decoder 420, under control of the processor 205, determines the dictionary store location 474 by decoding the dictionary store location 924 from the encoded bitstream 312, if the dictionary store flag determined in the step 1120 indicates that a dictionary store operation is to occur for the prediction unit (PU). The dictionary block location 924 can be a block index which specifies the location of the block to store down to a granularity, such as that of the current block size. As such, the block index can be a fixed length word of bypass bins, with the word including an X and a Y component of the block index (i.e. if the dictionary block memory 352 is itself arranged as a block of samples). The dictionary block location 924 can also be a block vector, specifying the location to store the block down to a unit-pel precision. As such, the block vector can be decoded using the motion vector delta syntax structure, to obtain the X and Y components of the block vector. For partition modes other than PART_2N×2N, the steps 1122 and 1124 are repeated for each prediction unit (PU) of the coding unit (CU).

At the store reconstructed samples step 1126 the reconstructed samples 458 are copied to the dictionary block memory 440, under control of the processor 205, at the decoded dictionary store location 474. The method 1000 then terminates.

In a specific implementation of the video decoder 134, at the store reconstructed samples step 1126, instead of storing the reconstructed samples 458 into the dictionary block memory 440, the prediction unit (PU) 466 is stored into the dictionary block memory 440. Such allows a pre-existing block of samples (e.g. as produced by the intra-block copy module 436) to be directly stored into the dictionary block memory 440 without adding any residual information.

In another implementation of the video encoder 114 and the video decoder 134, the only supported partition mode for the dictionary load operation and the dictionary store operation is PART_2N×2N. In such an arrangement, the size of the prediction unit (PU) is equal to the size of the coding unit (CU) for these operations. Then, there is only one dictionary load location 386, 468 per coding unit (CU) using the dictionary block copy prediction mode and only one dictionary store location 392, 474 per coding unit (CU) in which a dictionary store operation is performed.

In another arrangement of the video encoder 114 and the video decoder 134, the supported partition modes for the dictionary load operation and the dictionary store operation are PART_2N×2N and PART_N×N. In such arrangements, the size of the prediction unit (PU) is either equal to the size of the coding unit (CU) or equal to one quarter of the size of the coding unit (CU) for these operations. Then, there is either one dictionary load location 386, 468 or four dictionary load locations 386, 468 per coding unit (CU) using the dictionary block copy prediction mode, depending on the partition mode of the coding unit (CU). Also, there is either one dictionary store location 392, 474 or four dictionary store locations 392, 474 per coding unit (CU) in which a dictionary store operation is performed, depending on the partition mode of the coding unit (CU).

In yet another implementation of the video encoder 114 and the video decoder 134, the dictionary store operation is always applied to the coding unit (CU), i.e. as if the partition mode was PART_2N×2N, regardless of the actual partition mode of the coding unit (CU). In such implementations, the dictionary store flag 922 may be considered to be associated with the coding unit (CU) instead of being associated with a prediction unit (PU) of the coding unit (CU). In such implementations, only one dictionary store flag 922 and one dictionary store location 924 are present in the encoded bitstream 312 for each coding unit (CU), regardless of the partition mode of the coding unit (CU).

Figure 11B:
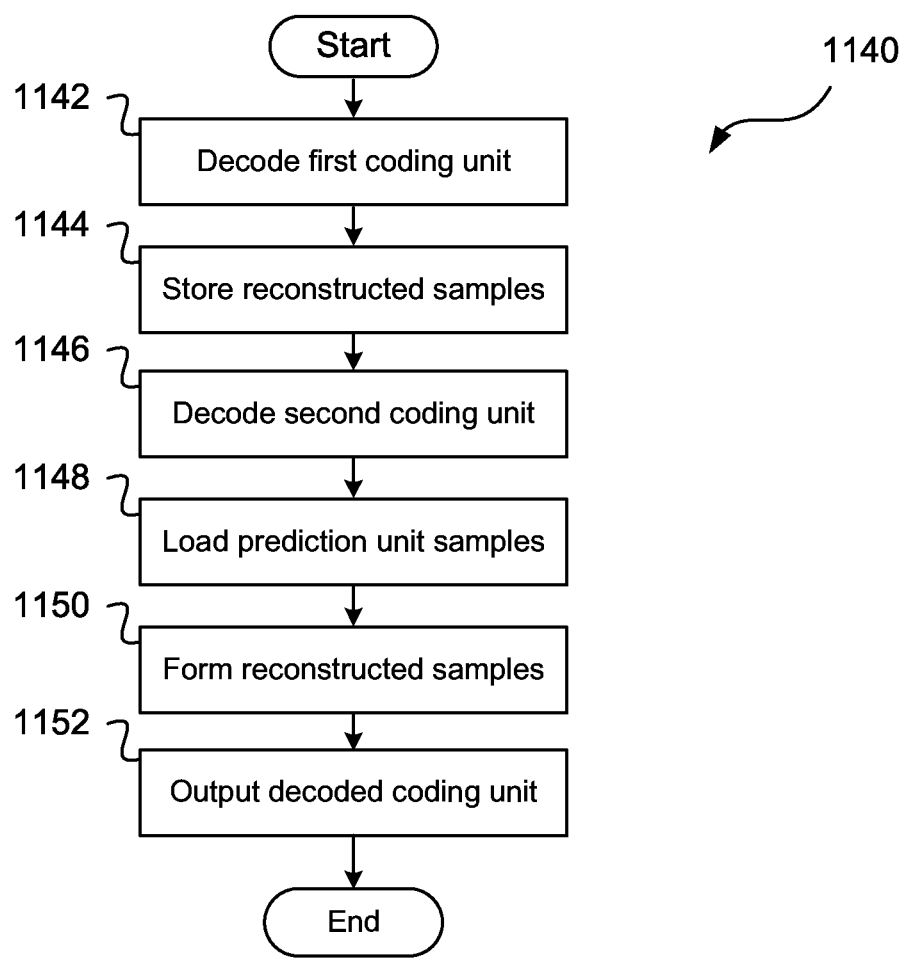
FIG. 11B is a schematic flow diagram showing a method for decoding a coding unit (CU) from an encoded bitstream using samples obtained from a dictionary memory that were earlier stored in the dictionary memory from an earlier decoded coding unit (CU)

FIG. 11B shows a method 1140 of decoding coding units (CUs) using dictionary block copy operation. The method 1140 involves decoding a first coding unit (CU) where the reconstructed samples of the prediction unit(s) (PUS) of the first coding unit (CU) are stored into the dictionary block memory 440. Then, the method 1140 involves decoding a second coding unit (CU) where the prediction units (PUs) for the second coding unit (CU) are produced by copying block(s) of samples from the dictionary block memory 440.

At a decode first coding unit step 1142 and a store reconstructed samples step 1144, the video decoder 134, under control of the processor 205, decodes a first coding unit (CU) from the encoded bitstream 312 by performing the method 1100 for the first coding unit (CU) and applying a dictionary store operation. As such, the reconstructed samples of the first coding unit (CU) are stored into the dictionary block memory 440 for subsequent use. The steps 1102-1108 and 1114-1118 are performed as part of the decode first coding unit step 1142. The step 1126 is performed as part of the step 1144.

At a decode second coding unit step 1146 and a load prediction unit samples step 1148, the video decoder 134, under control of the processor 205, decodes a second coding unit (CU) from the encoded bitstream 312 by performing the method 1100 for the second coding unit (CU) and applying a dictionary load operation. As such, the prediction units (PUs) for the second coding unit (CU) are obtained by copying one or more blocks of samples (e.g. as previously stored in the step 1144) from the dictionary block memory 440. The steps 1102-1110 and 1114-1116 are performed as part of the decode second coding unit step 1146 and the step 1112 is performed as part of the load prediction unit step 1148.

At a form reconstructed samples step 1150, the video decoder 134, under control of the processor 205, produces a block of reconstructed samples for the second coding unit (CU) by performing the step 1118 of the method 1100.

At an output decoded coding unit (CU) step 1152, the reconstructed samples of the second coding unit (CU) (i.e. those from the step 1150) are filtered in the de-blocking module 430 and then the de-blocked samples are stored in the frame buffer 432. Then, the de-blocked samples are output in one of the decoded frames 412 read from the frame buffer 432. The method 1140 then terminates.

FIG. 12 is a schematic flow diagram showing a method 1200 for decoding a prediction mode that includes a dictionary block copy prediction mode as one of the available modes of prediction. The method 1200 is performed as the decode prediction mode step 1104. A method for encoding the prediction mode in the video encoder 114 that corresponds to the steps of the method 1200 may be similarly represented and described.

At a decode intra_bc_flag step 1202 the entropy decoder 420, under control of the processor 205, decodes a context coded bin (e.g. 'intra_bc_flag' 1210) from the encoded bitstream 312 indicating if the coding unit (CU) uses intra block copy as the prediction mode. If this is the case, the method 1200 then terminates, with the prediction mode set to intra block copy.

At a decode dict_load_flag step 1204, the entropy decoder 420, under control of the processor 205, decodes a context coded bin (e.g. 'dict_load_flag' 1212) from the encoded bitstream 312 indicating if the coding unit (CU) uses dictionary block copy as the prediction mode. If this is the case, the method 1200 then terminates, with the prediction mode set to dictionary block copy.

At a slice type test step 1206, the processor 205 tests the type of the current slice. If the slice type is 'I', then inter-prediction is not available. In this case, the prediction mode is set to intra-prediction 1214 and the method 1200 then terminates.

At a decode pred_mode step 1208, the entropy decoder 420, under control of the processor 205, decodes a context coded bin (e.g. 'pred_mode') from the encoded bitstream 312 indicating if the coding unit (CU) uses intra-prediction 1214 or inter-prediction 1216. The method 1200 then terminates.

FIG. 13 is a schematic flow diagram showing a method 1300 for determining whether to store reconstructed samples into the dictionary block memory 352. The method 1300 is performed in the video encoder 114 by the processor 205. The method 1300 is one example of methods for storing reconstructed samples into the dictionary block memory 352, for example performed at step 1022 as described above. The method 1300 is simple as only one block size is used, even though storage of any supported sized block in the dictionary block memory 352 is possible. Also, the method 1300 has no 'eviction' method, so once all space in the dictionary block memory 352 is used, no further blocks are added for the remainder of the slice. On the slice boundary the entire dictionary is made available for new entries. The criteria for adding a block is also very simple in the method 1300, as the only requirement is that the block was predicted using intra-block copy mode and the block sized matched a predetermined block size, for the frame being coded The decision of the method 1300 is made in the video encoder 114 and encoded in the encoded bitstream 312 using the dictionary store flag 922 ('dict_store') at the step 1023. As such, the video decoder 134 is instructed which block of reconstructed samples 458 (i.e. from a first coding unit) is to be stored in the dictionary block memory 440. This block of reconstructed samples 458 is then available for selecting by a coding unit (i.e. a second coding unit) configured to use dictionary block copy mode (i.e. due to a dict_load_flag of the pred_mode 912).

At a test prediction modes step 1302, the video encoder 114, under control of the processor 205, tests different prediction modes for a coding unit (CU). For each prediction mode, various parameters are tested. For example, several different intra-prediction modes are generally tested. For inter-prediction, several different motion vectors are tested. For each test, the bit cost of encoding the result of the test (i.e. the syntax elements) is measured as is the distortion of that particular prediction mode (i.e. relative to the frame data 310). The bit cost and the distortion are combined into a single 'cost parameter'.

At a select prediction mode step 1304, the video encoder 114, under control of the processor 205, selects one prediction mode as the encoder decision for the coding unit (CU). The selected mode is generally the one offering the optimal cost parameter of all the tested prediction modes.

At an intra-block copy test step 1306, the processor 205 tests of the prediction mode selected in the step 1304 is an intra-block copy operation. If not, the method 1300 then terminates.

At a prediction unit (PU) size test step 1308, the processor 205 tests the size of the prediction unit (PU). If the size is other than a particular predetermined size (e.g. 8×8) the method 1300 then terminates.

At a dictionary space test step 1310, the processor 205 tests a map of the dictionary usage to determine if any 8×8 block is currently unused. If the dictionary block memory 352 provides storage for one 64×64 coding tree unit (CTU), one possible implementation of the map is an 8×8 array of flags (or 'usage map'), with each flag indicating if a corresponding 8×8 block of samples in the dictionary block memory 352 is available. If no 8×8 blocks are available, the method 1300 then terminates.

At a store reconstructed samples step 1312, the processor 205 stores the reconstructed samples for the coding unit (CU) into the dictionary block memory 352. The address to store the block is determined from the usage map. For example, the first available 8×8 block is selected for storing the 8×8 block of reconstructed samples. The method 1300 then terminates.

In an arrangement of the video encoder 114 that uses the method 1300 to store blocks of reconstructed samples in the dictionary block memory 352, the search dictionary step 1002 is performed as follows: the search is only performed when the prediction unit (PU) size is 8×8 and only entries marked as used by the usage map are tested. Then, the optimal block in terms of the cost parameter is selected as a candidate for the prediction unit (PU) (assuming alternative prediction modes do not provide a better cost parameter).

In an arrangement of the video encoder 114 that records the frequency of use of each block, the usage map includes a counter for each 8×8 block. Then, each time a particular 8×8 block is selected, the corresponding counter is incremented (up to a maximum value). The dictionary space test step 1310 is modified to 'evict' (or remove) blocks that are infrequently used (e.g. the least frequently used block). In such arrangements, unpopular blocks are removed from the dictionary block memory 352 to make room for potentially more popular blocks to be added.

In an arrangement of the video encoder 114, multiple prediction unit (PU) sizes are tested for addition into the dictionary block memory 352. In such arrangements, the usage map indicates the size of a particular block and account for a large sized block occupying the space of multiple smaller sized blocks.

In an arrangements of the video encoder 114, a prediction unit (PU) of a larger size (e.g. 16×16) is stored into the dictionary block memory 352 and smaller sized prediction units (PUs) (e.g. 8×8) are tested within the region occupied by the 16×16 prediction unit (PU) in the dictionary block memory 352. Specifying the location of the block of samples for the dictionary load operation using a block vector with unit-pel precision allows any smaller block (e.g. 8×8) of samples within the larger block (e.g. 16×16) to be tested and selected. Specifying the location of the block of samples using an index down to a prediction unit (PU) granularity (e.g. 4×4) allows any 8×8 block aligned to a 4-sample boundary horizontally and vertically to be tested and selected.

In some arrangements of the video encoder 114, a 'two pass' encoding of a frame of the frame data 310 is performed. In the first pass, an intra-block copy block search operation is performed, with the search range extended beyond the range afforded by the buffering provided by intra-block copy (i.e., 804 in FIGS. 8A-8D). As a result of this extended search range, intra block copy block vectors may select blocks from any location in the frame where reconstructed samples are available. The purpose of this first pass is to produce statistics about the frame that indicate which blocks in the frame provide the optimal (i.e. minimised) distortion. Then, a marking process is applied where the frame is divided into blocks of a particular size (e.g. 8×8) and the frequency of access to each block is recorded. Then, blocks that were selected for intra block copy above a threshold can be marked as 'popular' blocks, e.g. in a bit-map representing each 8×8 block in the frame with a 'popular' bit. Such a search is not compliant with the high efficiency video coding standard (HEVC) extension because the intra block copy vectors refer to blocks that are not available for decoding in the video decoder 134. Such a search is also expected to have a very large execution time due to the large search area. However, the representation of popular blocks (e.g. the bitmap) provides information useful for a second pass of encoding. As such, the encoding decisions of the first pass are not recorded in the encoded bitstream 312 (i.e. no bitstream is produced). In the second pass, the search compliant to the high efficiency video coding standard (HEVC) extension is performed. As such, the second pass produces an encoded bitstream 312. As the frame is encoded, the bitmap can be checked to determine if the current block was previously marked as 'popular'. If so, the block (i.e. first coding unit) is stored into the dictionary block memory 352 using a dictionary store operation. The usual search for encoding further coding units (CUs) (i.e. the second coding unit) in the second pass includes the dictionary block load prediction mode, and thus the popular blocks are candidates for selection as offering the optimal cost parameter. This arrangement of the video encoder 114 results in an encoded bitstream 312 having the greatest possible compression efficiency using the dictionary block copy mode, and as such provides an 'upper limit' on the compression efficiency achievable for a given amount of dictionary block memory buffer 352 440. In contrast, the method 1300 provides a simple method that achieves some of these gains, but does not require 'two pass' encoding and is suitable for real-time implementations of the video encoder 114.

Arrangements of the video decoder 134 that use the method 1100 to decode the coding unit (CU) syntax structure (e.g. 906) are capable of correctly decoding an encoded bitstream 312 produced by any of the arrangements of the video encoder 114 described above. Thus, it can be seen that considerable flexibility in the choice of encoding algorithms is available, with potential to achieve high compression efficiency for various types of content, without requiring further modification to the video decoder 134.

A specific implementation of the arrangements described herein is expressed in Appendix 1, which shows syntax tables according to the HEVC standard modified and varied according to the dictionary block copy prediction coding processes for encoding and decoding described herein.

INDUSTRIAL APPLICABILITY

The arrangements described are applicable to the computer and data processing industries and particularly for the digital signal processing for the encoding a decoding of signals such as video signals with reduces bit-rate of the compressed video signal, resulting in reduced costs for transmission and storage.

Experiments show that on some sequences, an upper limit of up to 50% bitstream size reduction (without significant change in PSNR) was achieved for intra-predicted frames using high efficiency video coding test sequences in the 'screen content coding' category.

The foregoing describes only some embodiments of the present invention, and modifications and/or changes can be made thereto without departing from the scope and spirit of the invention, the embodiments being illustrative and not restrictive.

APPENDIX 1

| Coding unit syntax | |
|---|---|
| coding_unit( x0, y0, log2CbSize ) { | Descriptor |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( intra_block_copy_enabled_flag ) | |
|       intra_bc_flag[ x0 ][ y0 ] | ae(v) |
|     if( !intra_bc_flag[ x0 ][ y0 ] ) | |
|       dict_load_flag[ x0 ][ y0 ] | |
|     if( dict_load_flag[ x0 ][ y0 ] ) | |
|       dict_load_loc[ x0 ][ y0 ] | |
|     if( slice_type != I && !intra_bc_flag[ x0 ][ y0 ] && !dict_load_flag[ x0 ][ y0 ]) | |
|       pred_mode_flag | ae(v) |
|     if( CuPredMode[ x0 ][ y0 ] != MODE_INTRA || intra_bc_flag[ x0 ][ y0 ] || | |
|       log2CbSize = = MinCbLog2SizeY ) | |
|       part_mode | ae(v) |
|     if( CuPredMode[ x0 ][ y0 ] = = MODE_INTRA ) { | |
|       if( PartMode = = PART_2N×2N && pcm_enabled_flag && | |
|         !intra_bc_flag[ x0 ][ y0 ] && | |
|         log2CbSize >= Log2MinIpcmCbSizeY && | |
|         log2CbSize <= Log2MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( x0, y0, log2CbSize ) | |
|     } else if( intra_bc_flag[ x0 ][ y0 ] ) { | |
|       mvd_coding( x0, y0, 2) | |
|       if( PartMode = = PART_2N×N ) | |
|         mvd_coding( x0, y0 + ( nCbS / 2 ), 2) | |
|       else if( PartMode = = PART_N×2N ) | |
|         mvd_coding( x0 + ( nCbS / 2 ), y0, 2) | |

APPENDIX 1-continued

```
        else if( PartMode = = PART_N×N ) {
          mvd_coding( x0 + ( nCbS / 2 ), y0, 2)
          mvd_coding( x0, y0 + ( nCbS / 2 ), 2)
          mvd_coding( x0 + ( nCbS / 2 ), y0 + ( nCbS / 2 ), 2)
        }
      } else {
        pbOffset = ( PartMode = = PART_N×N ) ? ( nCbS / 2 ) : nCbS
        for( j = 0; j < nCbS; j = j + pbOffset )
          for( i = 0; i < nCbS; i = i + pbOffset )
            prev_intra_luma_pred_flag[ x0 + i ][ y0 + j ]           ae(v)
        for( j = 0; j < nCbS; j = j + pbOffset )
          for( i = 0; i < nCbS; i = i + pbOffset )
            if( prev_intra_luma_pred_flag[ x0 + i ][ y0 + j ] )
              mpm_idx[ x0 + i ][ y0 + j ]                           ae(v)
            else
              rem_intra_luma_pred_mode[ x0 + i ][ y0 + j ]          ae(v)
        if( ChromaArrayType = = 3 )
          for( j = 0; j < nCbS; j = j + pbOffset )
            for( i = 0; i < nCbS; i = i + pbOffset )
              intra_chroma_pred_mode[ x0 + i ][ y0 + j ]            ae(v)
        else if( ChromaArrayType != 0 )
          intra_chroma_pred_mode[ x0 ][ y0 ]                        ae(v)
      }
    } else {
      if( PartMode = = PART_2N×2N )
        prediction_unit( x0, y0, nCbS, nCbS )
      else if( PartMode = = PART_2N×N ) {
        prediction_unit( x0, y0, nCbS, nCbS / 2 )
        prediction_unit( x0, y0 + ( nCbS / 2 ), nCbS, nCbS / 2 )
      } else if( PartMode = = PART_N×2N ) {
        prediction_unit( x0, y0, nCbS / 2, nCbS )
        prediction_unit( x0 + ( nCbS / 2 ), y0, nCbS / 2, nCbS )
      } else if( PartMode = = PART_2N×nU ) {
        prediction_unit( x0, y0, nCbS, nCbS / 4 )
        prediction_unit( x0, y0 + ( nCbS / 4 ), nCbS, nCbS * 3 / 4 )
      } else if( PartMode = = PART_2N×nD ) {
        prediction_unit( x0, y0, nCbS, nCbS * 3 / 4 )
        prediction_unit( x0, y0 + ( nCbS * 3 / 4 ), nCbS, nCbS / 4 )
      } else if( PartMode = = PART_nL×2N ) {
        prediction_unit( x0, y0, nCbS / 4, nCbS )
        prediction_unit( x0 + ( nCbS / 4 ), y0, nCbS * 3 / 4, nCbS )
      } else if( PartMode = = PART_nR×2N ) {
        prediction_unit( x0, y0, nCbS * 3 / 4, nCbS )
        prediction_unit( x0 + ( nCbS * 3 / 4 ), y0, nCbS / 4, nCbS )
      } else { /* PART_N×N */
        prediction_unit( x0, y0, nCbS / 2, nCbS / 2 )
        prediction_unit( x0 + ( nCbS / 2 ), y0, nCbS / 2, nCbS / 2 )
        prediction_unit( x0, y0 + ( nCbS / 2 ), nCbS / 2, nCbS / 2 )
   prediction_unit( x0 + ( nCbS / 2 ), y0 + ( nCbS / 2 ), nCbS / 2, nCbS / 2
)
      }
    }
    if( !pcm_flag[ x0 ][ y0 ] ) {
      if( CuPredMode[ x0 ][ y0 ] != MODE_INTRA &&
        !( PartMode = = PART_2N×2N && merge_flag[ x0 ][ y0 ] ) ||
        ( CuPredMode[ x0 ][ y0 ] = = MODE_INTRA &&
intra_bc_flag[ x0 ][ y0 ] ) )
        rqt_root_cbf                                                ae(v)
      if( rqt_root_cbf ) {
        MaxTrafoDepth = ( CuPredMode[ x0 ][ y0 ] = = MODE_INTRA ?
            ( max_transform_hierarchy_depth_intra + IntraSplitFlag ) :
            max_transform_hierarchy_depth_inter )
        transform_tree( x0, y0, x0, y0, log2CbSize, 0, 0 )
      }
    }
    dict_store[ x0 ][ y0 ]
    if( dict_store[ x0 ][ y0 ] )
      dict_store_loc[ x0 ][ y0 ]
  }
}
```

| Prediction unit syntax |  |
|---|---|
| prediction_unit( x0, y0, nPbW, nPbH ) { | Descriptor |
| if( cu_skip_flag[ x0 ][ y0 ] ) {  if( MaxNumMergeCand > 1 )   merge_idx[ x0 ][ y0 ] | ae(v) |

APPENDIX 1-continued

```
} else { /* MODE_INTER */
  if( dict_load[ x0base ][ y0base ] )
    dict_load_loc[ x0 ] y0 ]
  merge_flag[ x0 ][ y0 ]                                              ae(v)
  if( merge_flag[ x0 ][ y0 ] ) {
    if( MaxNumMergeCand > 1 )
      merge_idx[ x0 ][ y0 ]                                           ae(v)
  } else {
    if( slice_type = = B )
      inter_pred_idc[ x0 ][ y0 ]                                      ae(v)
    if( inter_pred_idc[ x0 ][ y0 ] != PRED_L1 ) {
      if( num_ref_idx_l0_active_minus1 > 0 )
        ref_idx_l0[ x0 ][ y0 ]                                        ae(v)
      mvd_coding( x0, y0, 0 )
      mvp_l0_flag[ x0 ][ y0 ]                                         ae(v)
    }
    if( inter_pred_idc[ x0 ][ y0 ] != PRED_L0 ) {
      if( num_ref_idx_l1_active_minus1 > 0 )
        ref_idx_l1[ x0 ][ y0 ]                                        ae(v)
      if( mvd_l1_zero_flag &&
        inter_pred_idc[ x0 ][ y0 ] = = PRED_BI ) {
        MvdL1[ x0 ][ y0 ][ 0 ] = 0
        MvdL1[ x0 ][ y0 ][ 1 ] = 0
      } else
        mvd_coding( x0, y0, 1 )
      mvp_l1_flag[ x0 ][ y0 ]                                         ae(v)
    }
  }
 }
}
```

We claim:

1. A computer-implemented method of decoding a coding unit from a video bitstream, comprising:
   determining, using a processor, reconstructed samples for a first prediction unit in a first coding unit of a frame, from the video bitstream;
   decoding, using the processor, a dictionary store flag from the video bitstream based on a partition mode for the first prediction unit; and
   where the dictionary store flag indicates that reconstructed samples for the first prediction unit be stored if the first prediction unit has a predetermined size:
   storing the reconstructed samples for the first prediction unit of the frame into a processor-accessible memory buffer;
   determining, using the processor, reconstructed samples for a second prediction unit in a second coding unit of the frame, the reconstructed samples for the second prediction unit being copied from reconstructed samples for the first prediction unit from the memory buffer; and
   outputting, using the processor, the reconstructed samples for the second prediction unit in the frame.

2. The method according to claim 1, wherein a dictionary store location is decoded from the video bitstream to indicate where to store the reconstructed samples for the first prediction unit in the memory buffer.

3. The method according to claim 2, wherein the memory buffer is arranged as an array of samples.

4. The method according to claim 3, wherein the dictionary store location specifies the location as a two-dimensional vector.

5. The method according to claim 2, wherein the second prediction unit uses a dictionary block copy prediction mode.

6. The method according to claim 5, wherein a dictionary load location specifies the location in the memory buffer from which to copy the reconstructed samples for the second prediction unit.

7. The method according to claim 1, wherein setting of the dictionary store flag indicates that reconstructed samples for a prediction unit are available for decoding a subsequent coding unit.

8. The method according to claim 1, wherein reconstructed samples stored in the memory buffer are those samples produced by intra-block copy prediction.

9. The method according to claim 1, where the predetermined size is selected from a group of predetermined sizes that comprise the following predetermined sizes:
   8×8 samples;
   16×16 samples; and
   32×32 samples.

10. The method according to claim 1, wherein the predetermined size is one of a size of the first coding unit, and a size that is one quarter of the size of the first coding unit.

11. A computer-implemented method of encoding a coding unit into a video bitstream, comprising:
    determining, using a processor, reconstructed samples for a first prediction unit in a first coding unit of a frame, from video frame data;
    establishing, using the processor, a dictionary store flag for indicating that reconstructed samples for the first prediction unit are stored if the first prediction unit has a predetermined size, the dictionary store flag being based on a partition mode for the first prediction unit; and
    where the dictionary store flag indicates that reconstructed samples for the first prediction unit are stored:
    storing reconstructed samples for the first prediction unit of the frame in a dictionary block memory buffer;
    determining, using the processor, reconstructed samples for a second prediction unit in a second coding unit of the frame, the reconstructed samples for the second prediction unit being copied from reconstructed samples for the first prediction unit from the dictionary block memory buffer; and outputting, using the processor, the reconstructed samples for the second prediction unit in the bitstream.

12. The method according to claim 11, wherein the dictionary store flag is encoded in the bitstream.

13. The method according to claim 11, wherein the stored reconstructed samples comprise reconstructed samples used for intra block copy predicted encoding of the first prediction unit.

14. The method according to claim 13, wherein the predetermined size is selected from a group of predetermined sizes that comprise the following predetermined sizes:
    8×8 samples;
    16×16 samples; and
    32×32 samples.

15. The method according to claim 13, wherein the predetermined size is one of a size of the first coding unit, and a size that is one quarter of the size of the first coding unit.

16. A non-transitory computer readable storage medium having a program recorded thereon, the program being executable by a processor to decode a coding unit from a video bitstream, the program comprising:
    code for determining reconstructed samples for a first prediction unit in a first coding unit of a frame, from the video bitstream;
    code for decoding a dictionary store flag from the video bitstream based on a partition mode for the first prediction unit; and
    code, operative where the dictionary store flag indicates that reconstructed samples for the first prediction unit be stored if the first prediction unit has a predetermined size, to:
        store the reconstructed samples for the first prediction unit of the frame into a memory buffer;
        determine reconstructed samples for a second prediction unit in a second coding unit of the frame, the reconstructed samples for the second prediction unit being copied from reconstructed samples for the first prediction unit from the memory buffer; and
        output the reconstructed samples for the second prediction unit in the frame.

17. A non-transitory computer readable storage medium having a program recorded thereon, the program being executable by a processor to encode a coding unit into a video bitstream, the program comprising:
    code for determining reconstructed samples for a first prediction unit in a first coding unit of a frame, from video frame data;
    code for establishing a dictionary store flag for indicating that reconstructed samples for the first prediction unit are stored if the first prediction unit has a predetermined size, the dictionary store flag being based on a partition mode for the first prediction unit; and
    code, operative where the dictionary store flag indicates that reconstructed samples for the first prediction unit are stored, to:
        store reconstructed samples for the first prediction unit of the frame in a dictionary block memory buffer;
        determine reconstructed samples for a second prediction unit in a second coding unit of the frame, the reconstructed samples for the second prediction unit being copied from reconstructed samples for the first prediction unit from the dictionary block memory buffer; and
        output the reconstructed samples for the second prediction unit in the bitstream.

18. A video decoder adapted to decode a coding unit from a video bitstream, the decoder comprising:
    reconstruction apparatus adapted to use a processor to determine reconstructed samples and decode a dictionary store flag for a first prediction unit in a first coding unit of a frame, from the video bitstream; and
    a dictionary block copy module adapted, where the dictionary store flag indicates that reconstructed samples for the first prediction unit be stored if the first prediction unit has a predetermined size, the dictionary store flag being based on a partition mode for the first prediction unit, to:
        store the reconstructed samples for the first prediction unit of the frame into a processor-accessible memory buffer;
        determine, using the processor, reconstructed samples for a second prediction unit in a second coding unit of the frame, the reconstructed samples for the second prediction unit being copied from reconstructed samples for the first prediction unit from the memory buffer; and
        output, using the processor, the reconstructed samples for the second prediction unit in the frame.

19. A video encoder for encoding a coding unit into a video bitstream, the video encoder comprising:
    reconstruction apparatus adapted to use a processor to determine reconstructed samples for a first prediction unit in a first coding unit of a frame from video frame data;
    a dictionary block selector adapted to establish a dictionary store flag for indicating that reconstructed samples for the first prediction unit are stored if the first prediction unit has a predetermined size, the dictionary store flag being based on a partition mode for the first prediction unit; and
    a dictionary block copy module adapted, where the dictionary store flag indicates that reconstructed samples for the first prediction unit are stored, to:
        store reconstructed samples for the first prediction unit of the frame in a dictionary block memory buffer;
        determine, using the processor, reconstructed samples for a second prediction unit in a second coding unit of the frame, the reconstructed samples for the second prediction unit being copied from reconstructed samples for the first prediction unit from the dictionary block memory buffer; and
        output, using the processor, the reconstructed samples for the second prediction unit in the bitstream.

* * * * *